United States Patent
Kim et al.

(10) Patent No.: US 10,782,829 B2
(45) Date of Patent: Sep. 22, 2020

(54) TOUCH SENSING SYSTEM

(71) Applicant: SAMSUNG DISPLAY CO., LTD., Yongin-si, Gyeonggi-do (KR)

(72) Inventors: Jeonkyoo Kim, Seoul (KR); Gilcho Ahn, Seoul (KR)

(73) Assignee: Samsung Display Co., Ltd. (KR)

( * ) Notice: Subject to any disclaimer, the term of this patent is extended or adjusted under 35 U.S.C. 154(b) by 59 days.

(21) Appl. No.: 15/836,382

(22) Filed: Dec. 8, 2017

(65) Prior Publication Data

US 2018/0164922 A1 Jun. 14, 2018

(30) Foreign Application Priority Data

Dec. 8, 2016 (KR) .................. 10-2016-0166721

(51) Int. Cl.
*G06F 3/044* (2006.01)
*G06F 3/041* (2006.01)

(52) U.S. Cl.
CPC ............ *G06F 3/044* (2013.01); *G06F 3/0412* (2013.01); *G06F 3/0418* (2013.01); *G06F 2203/04104* (2013.01); *G06F 2203/04112* (2013.01)

(58) Field of Classification Search
CPC ............................................. G06F 2207/4814
See application file for complete search history.

(56) References Cited

U.S. PATENT DOCUMENTS

| | | | |
|---|---|---|---|
| 8,514,189 B2 | 8/2013 | Wu et al. | |
| 8,614,587 B1* | 12/2013 | Ogirko | G06F 3/044 324/678 |
| 8,841,927 B2 | 9/2014 | Ann et al. | |
| 9,465,492 B2 | 10/2016 | Miyamoto et al. | |
| 9,465,497 B2 | 10/2016 | Han et al. | |
| 2011/0080353 A1 | 4/2011 | Kang et al. | |
| 2011/0163994 A1* | 7/2011 | Tang | G06F 3/044 345/174 |
| 2013/0050116 A1* | 2/2013 | Shin | G06F 3/044 345/173 |
| 2014/0049510 A1* | 2/2014 | Chung | G06F 3/0416 345/174 |

FOREIGN PATENT DOCUMENTS

| | | |
|---|---|---|
| KR | 10-2011-0037579 A | 4/2011 |
| KR | 10-2012-0119419 A | 10/2012 |
| KR | 10-1487638 B1 | 1/2015 |
| KR | 10-2015-0080248 A | 7/2015 |

* cited by examiner

Primary Examiner — Robin J Mishler
(74) Attorney, Agent, or Firm — Innovation Counsel LLP

(57) ABSTRACT

A touch sensing system includes: a touch sensor including a plurality of sensing electrodes; and a first comparator including a first input end, a second input end and an output end, the first comparator amplifying a difference between the first input end and the second input end. The first input end is electrically connected to at least two sensing electrodes of the plurality of sensing electrodes which are adjacent to each other, and the second input end is electrically connected to at least two sensing electrodes of the plurality of sensing electrodes which are not adjacent each other and adjacent to the at least two sensing electrodes connected to the first input end, respectively.

16 Claims, 26 Drawing Sheets

TOUCH SENSING SYSTEM

CROSS-REFERENCE TO RELATED APPLICATION

This application claims priority under 35 U.S.C. § 119 to Korean Patent Application No. 10-2016-0166721, filed on Dec. 8, 2016, in the Korean Intellectual Property Office (KIPO), the disclosure of which is incorporated by reference herein in its entirety.

1. TECHNICAL FIELD

Embodiments of the present inventive concept relate to a touch sensing system, and more particularly, to a large-sized touch sensing system capable of substantially simultaneously detecting whether or not a plurality of sensing lines are touched.

2. DISCUSSION OF RELATED ART

In recent times, smart phones, tablet computers, game devices, learning aids and cameras are widely used due to the development of portable devices, and input methods of these devices are evolving from conventional input devices such as mouse and keyboard to touch methods. As the touch input method allows users to control the devices by directly selecting an icon or a program on the screen while viewing the screen, it is possible to reduce the size and weight of the devices and provide an intuitive use method to a user.

As for a touch recognition method, a resistance film type and a capacitance type are most widely used. Among them, capacitive type touch panels having a simple structure and high operation reliability have been rapidly expanding the range of use recently.

It is to be understood that this background of the technology is intended to provide useful background for understanding the technology and as such disclosed herein, the technology background may include ideas, concepts or recognitions that were not part of what was known or appreciated by those skilled in the pertinent art prior to a corresponding effective filing date of subject matter disclosed herein.

SUMMARY

Embodiments of the present inventive concept may be directed to a touch sensing system for detecting a signal of a touch sensor using a differential amplifier.

According to an exemplary embodiment, a touch sensing system includes: a touch sensor including a plurality of sensing electrodes; and a first comparator including a first input end, a second input end and an output end, the first comparator amplifying a difference between the first input end and the second input end. The first input end may be electrically connected to two sensing electrodes of the plurality of sensing electrodes which are not adjacent to each other, and the second input end is electrically connected to two sensing electrodes of the plurality of sensing electrodes which are not adjacent each other and adjacent to the two sensing electrodes connected to the first input end, respectively.

The first input end and the second input end may be connected to the two sensing electrodes through serial capacitors, respectively.

The output end of the first comparator may include a plurality of output terminals and one of the plurality of output terminals may be connected to the first input end through a serial capacitor.

Another of the plurality of output terminals of the first comparator may be connected to the second input end through a serial capacitor.

The touch sensing system may further include a switch for connecting one end of at least one of the serial capacitors connected to the first input end to a reference voltage source.

The touch sensing system may further include a switch for connecting at least one of the serial capacitors connected to the second input end to a reference voltage source.

The reference voltage source may be a variable voltage source.

The touch sensing system may further include a multiplexer for selectively connecting the first input end and the second input end to the plurality of sensing electrodes.

The touch sensing system may further include a second comparator including input terminals connected to the output terminals of the first comparator.

The touch sensing system may further include a capacitor between the output terminal of the first comparator and the input terminal of the second comparator.

According to an exemplary embodiment, a touch sensing system includes: a touch sensor including a plurality of transmitting electrodes and a plurality of sensing electrodes insulated from and crossing the plurality of transmitting electrodes; a touch driver transmitting a touch detection signal to the plurality of transmitting electrodes; and a first comparator including a first input end, a second input end and an output end, the first comparator amplifying a difference between the first input end and the second input end. The touch driver substantially simultaneously transmits touch detection signals having different phases to the plurality of transmitting electrodes, the first input end is electrically connected to two sensing electrodes of the plurality of sensing electrodes which are not adjacent to each other, and the second input end is electrically connected to two sensing electrodes of the plurality of sensing electrodes which are not adjacent to each other and adjacent to the plurality of sensing electrodes connected to the first input end, respectively.

The first input end and the second input end may be connected to the two sensing electrodes through serial capacitors, respectively.

The output end of the first comparator may include a plurality of output terminals and one of the plurality of output terminals may be connected to the first input end by a serial capacitor.

The touch sensing system may further include a switch for connecting one end of at least one of the serial capacitors connected to the first input end to a reference voltage source.

The touch sensing system may further include a multiplexer for selectively connecting the first input end and the second input end to the plurality of sensing electrodes.

The touch sensing system may further include a second comparator including input terminals connected to the output terminals of the first comparator.

The foregoing is illustrative only and is not intended to be in any way limiting. In addition to the illustrative aspects, exemplary embodiments and features described above, further aspects, exemplary embodiments and features will become apparent by reference to the drawings and the following detailed description.

BRIEF DESCRIPTION OF THE DRAWINGS

A more complete appreciation of the present inventive concept will become more apparent by describing in detail exemplary embodiments thereof with reference to the accompanying drawings, wherein.

DETAILED DESCRIPTION

Figure 1:
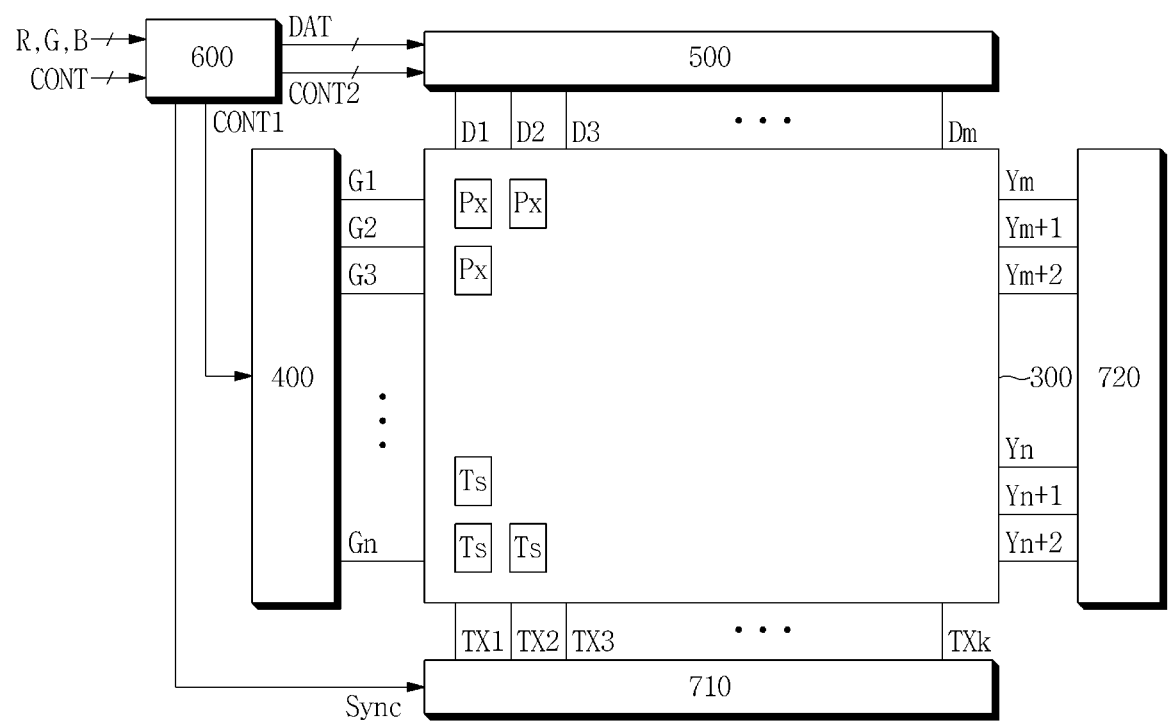
FIG. 1 is a layout diagram illustrating a display device including a touch sensor.

Exemplary embodiments will now be described more fully hereinafter with reference to the accompanying drawings. Although the inventive concept may be modified in various manners and have several exemplary embodiments, exemplary embodiments are illustrated in the accompanying drawings and will be mainly described in the specification. However, the scope of the inventive concept is not limited to the exemplary embodiments and should be construed as including all the changes, equivalents and substitutions included in the spirit and scope of the inventive concept.

In the drawings, thicknesses of a plurality of layers and areas are illustrated in an enlarged manner for clarity and ease of description thereof. When a layer, area, or plate is referred to as being "on" another layer, area, or plate, it may be directly on the other layer, area, or plate, or intervening layers, areas, or plates may be present therebetween. Conversely, when a layer, area, or plate is referred to as being "directly on" another layer, area, or plate, intervening layers, areas, or plates may be absent therebetween. Further when a layer, area, or plate is referred to as being "below" another layer, area, or plate, it may be directly below the other layer, area, or plate, or intervening layers, areas, or plates may be present therebetween. Conversely, when a layer, area, or plate is referred to as being "directly below" another layer, area, or plate, intervening layers, areas, or plates may be absent therebetween.

The spatially relative terms "below", "beneath", "lower", "above", "upper" and the like, may be used herein for ease of description to describe the relations between one element or component and another element or component as illustrated in the drawings. It will be understood that the spatially relative terms are intended to encompass different orientations of the device in use or operation, in addition to the orientation depicted in the drawings. For example, in the case where a device illustrated in the drawing is turned over, the device positioned "below" or "beneath" another device may be placed "above" another device. Accordingly, the illustrative term "below" may include both the lower and upper positions. The device may also be oriented in the other direction and thus the spatially relative terms may be interpreted differently depending on the orientations.

Throughout the specification, when an element is referred to as being "connected" to another element, the element is "directly connected" to the other element, or "electrically connected" to the other element with one or more intervening elements interposed therebetween. It will be further understood that the terms "comprises," "including," "includes" and/or "including," when used in this specification, specify the presence of stated features, integers, steps, operations, elements and/or components, but do not preclude the presence or addition of one or more other features, integers, steps, operations, elements, components and/or groups thereof.

It will be understood that, although the terms "first," "second," "third," and the like may be used herein to describe various elements, these elements should not be limited by these terms. These terms are only used to distinguish one element from another element. Thus, "a first element" discussed below could be termed "a second element" or "a third element," and "a second element" and "a third element" may be termed likewise without departing from the teachings herein.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value.

Unless otherwise defined, all terms used herein (including technical and scientific terms) have the same meaning as commonly understood by those skilled in the art to which this inventive concept pertains. It will be further understood that terms, such as those defined in commonly used dictionaries, should be interpreted as having a meaning that is consistent with their meaning in the context of the relevant art and will not be interpreted in an ideal or excessively formal sense unless clearly defined in the present specification.

Some of the parts which are not associated with the description may not be provided in order to specifically describe embodiments of the present inventive concept and like reference numerals refer to like elements throughout the specification.

FIG. 1 is a layout diagram illustrating a display device including a touch sensor.

Referring to FIG. 1, a display device including a touch sensor according to an exemplary embodiment includes a display panel 300; a scan driver 400, a data driver 500, a touch driver 710 and a touch sensor chip 720 connected to the display panel 300; and a signal controller 600 for controlling the scan driver 400 and the data driver 500.

The display panel 300 includes a plurality of scan signal lines G1 to Gn, a plurality of data lines D1 to Dm, and a plurality of pixels PX connected to the scan signal lines G1 to Gn and the data lines D1 to Dm and substantially arranged in a matrix form. The display panel 300 may include a touch sensing unit including a plurality of touch sensors Ts substantially arranged in a matrix form.

Alternatively, a separate touch sensing unit including a plurality of touch sensors Ts may be attached to a front surface of the display panel 300.

The scan signal lines G1 to Gn may substantially extend in a row direction and transmit a gate signal including a gate on voltage which may turn on a switch element such as a thin film transistor connected to each pixel PX and a gate off voltage which may turn off the switch element.

The data lines D1 to Dm may substantially extend in a column direction and transmit a data voltage when the switch element connected to each pixel PX is turned on.

The pixel PX is a unit for displaying images. One pixel may uniquely display one of primary colors, or a plurality of pixels may alternately display primary colors according to time, such that a desired color may be displayed by the spatial sum or the temporal sum of the primary colors. A common voltage and a data voltage may be applied to each pixel PX.

The signal controller 600 receives image signals R, G and B and a control signal CONT of the input image signals R, G and B, which are input from an external graphic processor (not illustrated). Examples of the control signal CONT may include a horizontal synchronization signal, a vertical synchronization signal, a clock signal, a data enable signal, and the like. The signal controller 600 processes the image signals R, G and B based on the image signals R, G and B and the control signals CONT according to operational conditions of the display panel 300 and then generates and outputs image data DAT, a gate control signal CONT1, a data control signal CONT2 and a clock signal. The signal controller 600 also outputs a synchronization signal Sync to the touch driver 710.

The gate control signal CONT1 includes a start pulse vertical signal STV for giving an instruction to start scanning and a clock pulse vertical signal CPV according to which the gate on voltage is generated. An output period of the start pulse vertical signal STV coincides with one frame (or a refresh rate). The gate control signal CONT1 may further include an output enable signal OE which limits a duration of the gate on voltage.

The data control signal CONT2 includes a start pulse horizontal signal for giving an instruction to start transmission of the image data DAT for one row of pixels and a load signal or giving an instruction to apply a corresponding data voltage to the data lines D1 to Dm.

The scan driver 400 applies a gate on voltage and a gate off voltage to the scan signal lines G1 to Gn according to the gate control signal CONT1.

The data driver 500 receives the data control signal CONT2 and the image data DAT from the signal controller 600, converts the image data DAT to a data voltage using a gray scale voltage generated by a gray scale voltage generator (not illustrated), and applies the data voltage to the data lines D1 to Dm. The data voltage may include a positive polarity data voltage and a negative polarity data voltage, and the positive polarity data voltage and the negative polarity data voltage may be applied in an alternate manner with respect to each frame, each row and/or each column.

The touch sensor Ts includes a transmitting electrode TX and a sensing electrode Y.

The transmitting electrode TX is connected to a touch driver 710 to transmit a touch detection signal.

The sensing electrode Y is connected to a touch sensor chip 720 and detects the touch detection signal transmitted through the transmitting electrode TX to determine a touch position.

Figure 2:
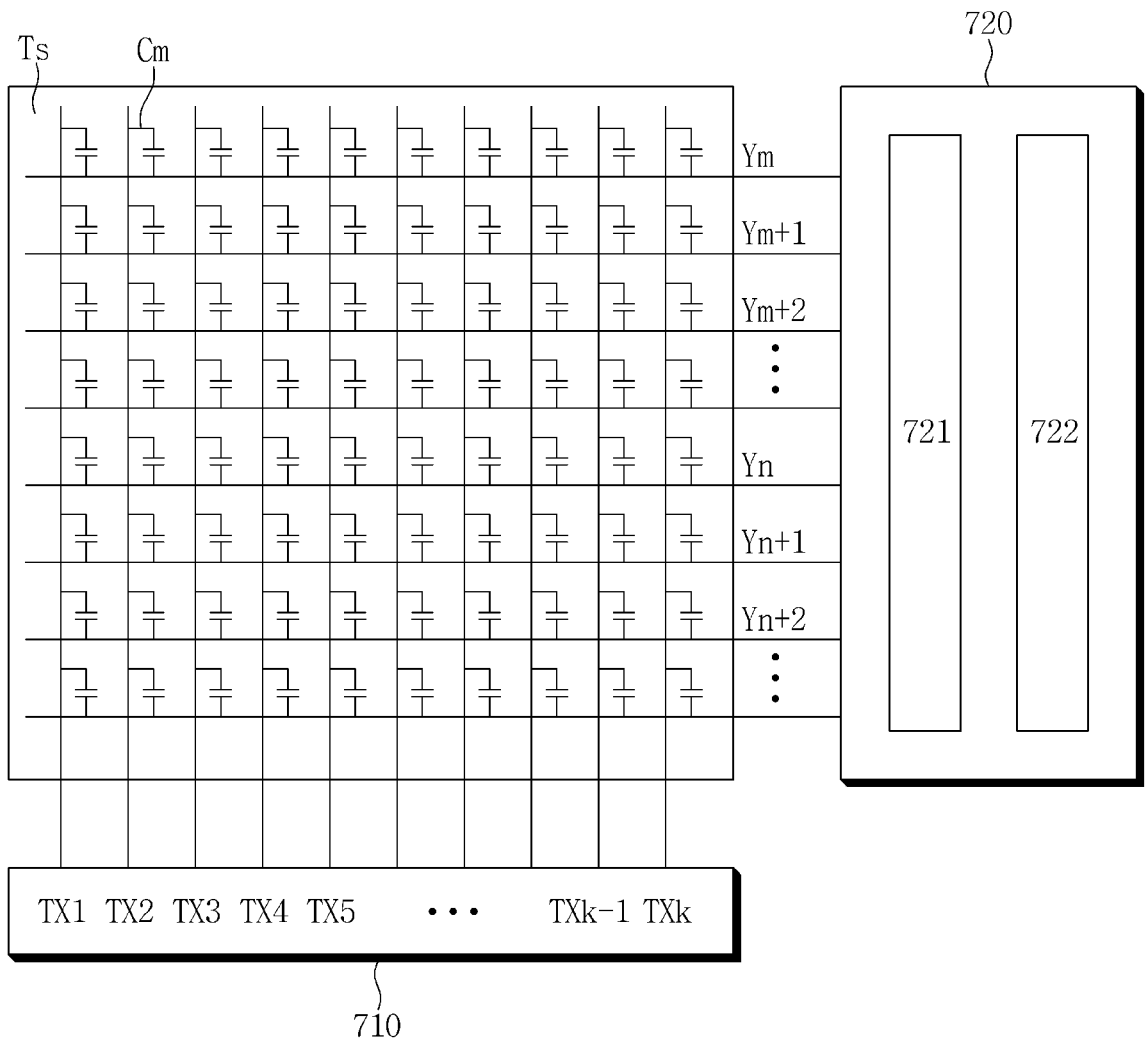
FIG. 2 is a conceptual diagram illustrating a touch sensing system according to an exemplary embodiment.

FIG. 2 is a conceptual diagram illustrating a touch sensing system according to an exemplary embodiment.

Referring to FIG. 2, a touch sensing method according to an exemplary embodiment employs a mutual capacitive touch method.

According to the capacitive touch method, an electric field is formed between two touch sensors respectively responsible for transmission and reception, and when a dielectric conductor approaches the touch sensor and disturbs the electric field between the two touch sensors, a change in capacitance which is caused by the disturbance is detected.

According to the mutual capacitive method, the touch sensor Ts includes a transmitting electrode TX (TX1, TX2, . . . , TXk) and a sensing electrode Y (Ym, Ym+1, . . . , Yn+2). The transmitting electrode Tx transmits a touch detection signal and the sensing electrode Y receives the touch detection signal. Due to an electrode pattern and a structure of the transmitting electrode TX and the sensing electrode Y which are insulated from and face each other, a mutual capacitor Cm is formed between the transmitting electrode TX and the sensing electrode Y.

Referring to FIG. 2, the touch driver 710 is connected to transmitting electrodes TX1 to TXk and the touch sensor chip 720 is connected to the sensing electrode Y. The touch sensor chip 720 includes a differential amplifier 721 and a touch determinator 722.

The differential amplifier 721 compares the touch detection signals input from the plurality of sensing electrodes Y, and the touch determinator 722 analyzes the comparison result of the differential amplifier 721 to determine a touch position. Detailed operation of the differential amplifier 721 will be described below.

Figure 3:
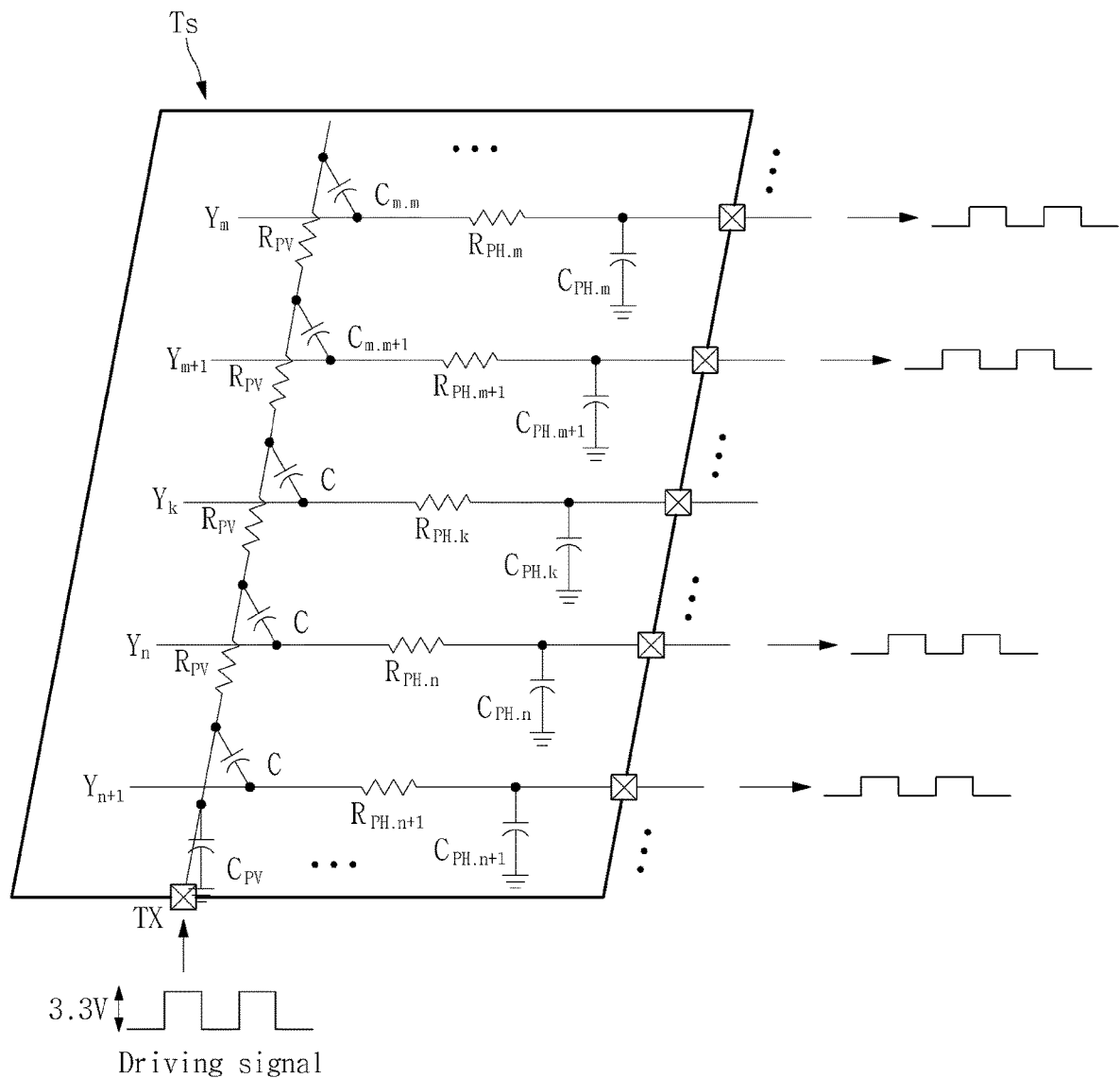
FIG. 3 is an equivalent circuit diagram schematically illustrating a touch sensor according to an exemplary embodiment.

FIG. 3 is an equivalent circuit diagram schematically illustrating a touch sensor according to an exemplary embodiment.

Referring to FIG. 3, in the touch sensor Ts, the transmitting electrode TX and the sensing electrode Y are insulated from and cross each other.

Although not illustrated, a sensor pattern may be provided for each of the transmitting electrode TX and the sensing electrode Y at a point where the transmitting electrode TX and the sensing electrode Y cross each other. The sensor pattern may generally have a quadrangular or rhombic shape. As a planar area in which the two electrodes, i.e., the transmitting electrode TX and the sensing electrode Y, oppose each other increases, a mutual capacitor Cm having a larger capacitance may be formed between the two electrodes.

The transmitting electrode TX receives a touch detection signal from a touch driver (not illustrated in FIG. 3).

The touch detection signal transmitted to the transmitting electrode TX is a pulse wave having a constant frequency. The touch detection signal input to the transmitting electrode TX is transmitted to the sensing electrode Y by the mutual capacitor Cm.m.

The transmitting electrode TX includes a parasitic resistor RPV formed along an extension direction. The parasitic resistor RPV is an inherent resistor component having a resistance determined by a structure and material characteristics of the transmitting electrode TX. The parasitic resistor RPV causes a voltage drop in a signal applied to the transmitting electrode TX.

The transmitting electrode TX also includes a parasitic capacitor CPV formed along the extension direction of the transmitting electrode TX. The parasitic capacitor CPV may be formed between one transmitting electrode TX and another transmitting electrode TX adjacent thereto or between one transmitting electrode TX and an adjacent conductive layer having a different electric potential.

The parasitic resistor RPV and the parasitic capacitor CPV of the transmitting electrode TX may cause a voltage drop and a signal delay in the touch detection signal.

The sensing electrode Y crosses the transmitting electrode TX and is connected to an external touch sensor chip 720 through a terminal portion of the touch sensor Ts.

The touch detection signal transmitted to the sensing electrode Y is degraded by the parasitic resistor RPV, the parasitic capacitor CPV and the mutual capacitor Cm.m. The signal degradation is caused by the voltage drop due to the resistor component and the signal delay due to the capacitor component. Accordingly, the signal degradation may become larger as a distance from an input end of the transmitting electrode TX increases.

The sensing electrode Y may include a parasitic resistor $R_{PH}$ and a parasitic capacitor $C_{PH}$.

In FIG. 3, a voltage of the touch detection signal is about 3.3 V by way of example. However, the touch detection signal may have various voltage levels and waveforms depending on a size of the touch sensor Ts and a sensing method. In addition, the touch driver 710 and the touch sensor chip 720 may be formed into a single touch driving chip.

Figure 4:
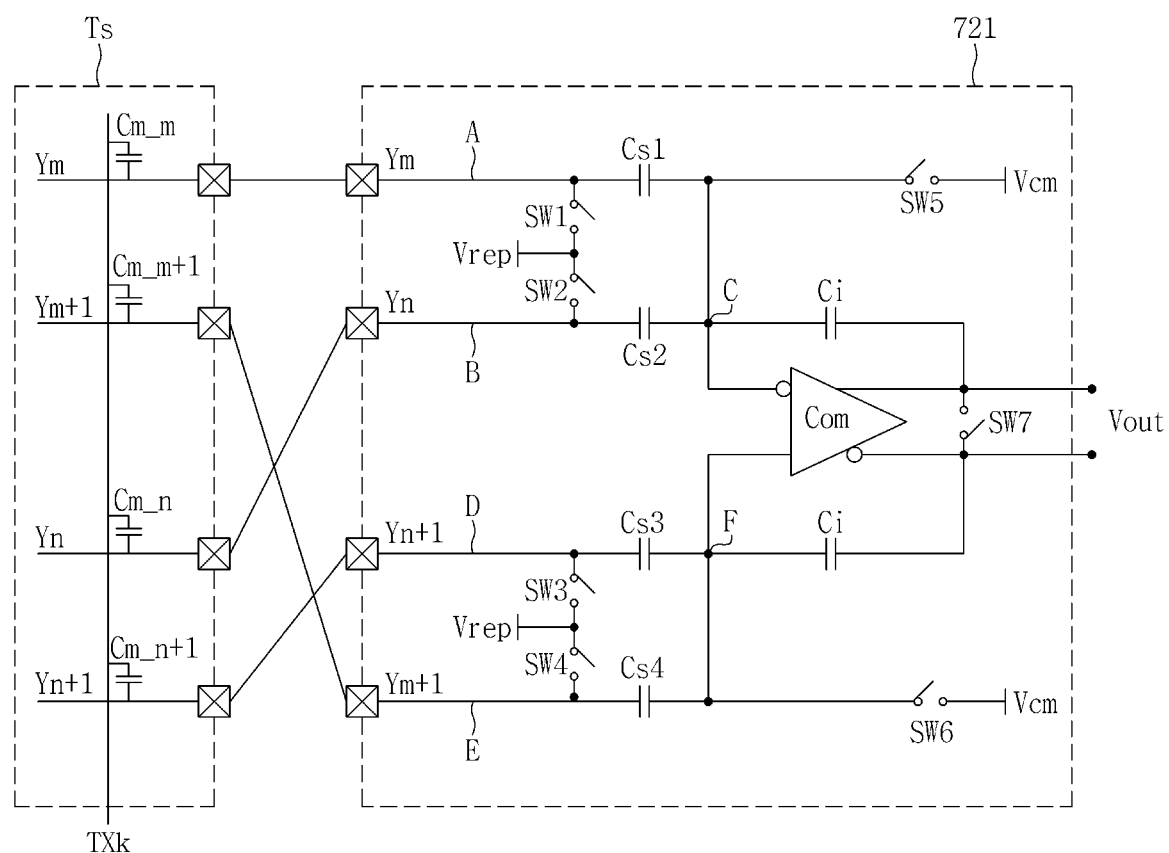
FIG. 4 is a circuit diagram illustrating a differential amplifier of a touch sensor chip according to an exemplary embodiment.

FIG. 4 is a circuit diagram illustrating a differential amplifier in a touch sensor chip according to an exemplary embodiment.

Figure 5:
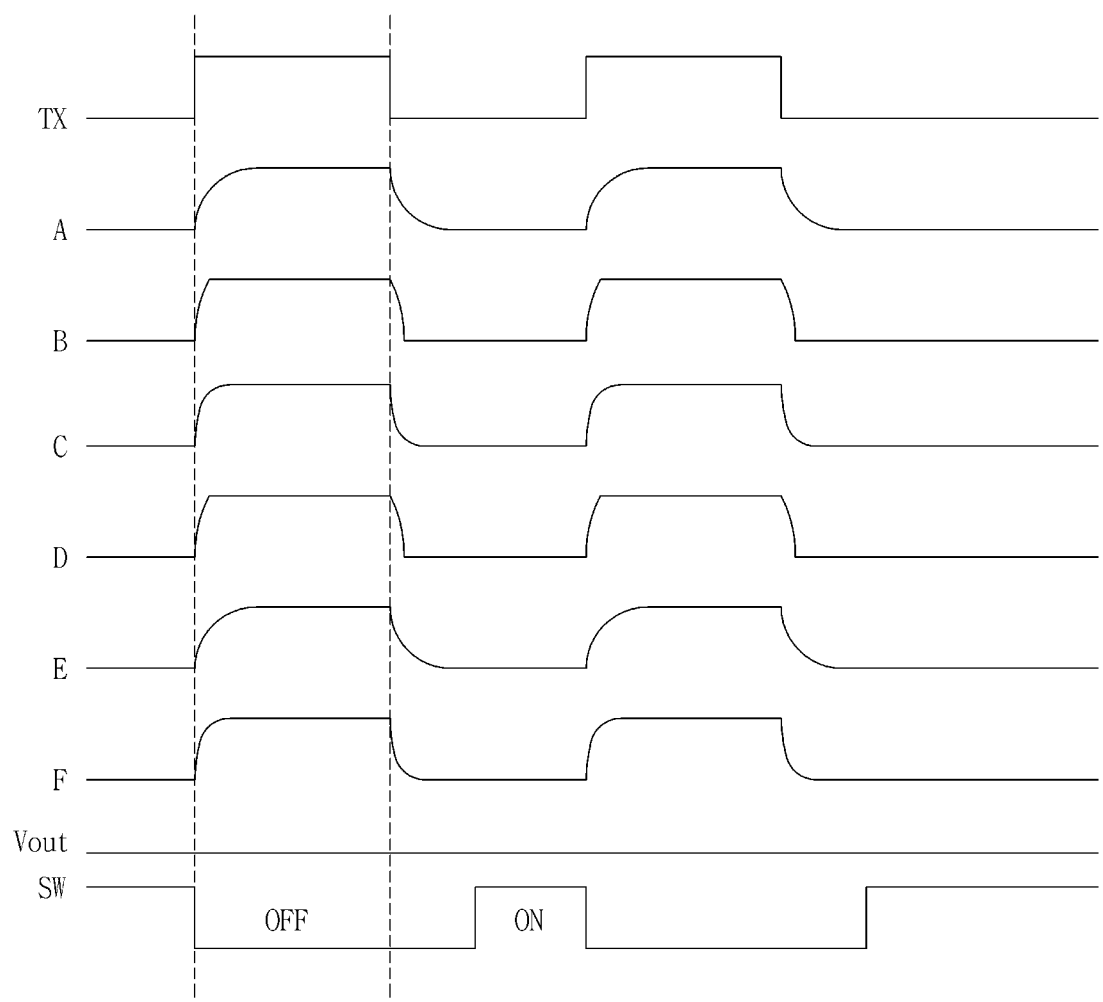
FIG. 5 is an exemplary waveform diagram illustrating a differential amplifier in a standby state of the circuit diagram of FIG. 4.

FIG. 5 is an exemplary waveform diagram illustrating a differential amplifier in a standby state of the circuit diagram of FIG. 4.

Referring to FIG. 4, the touch sensor Ts includes the transmitting electrode TXk, the sensing electrode Y crossing the transmitting electrode TXk and the mutual capacitor Cm.m formed at a point where the transmitting electrode TXk and the sensing electrode Y cross each other.

The differential amplifier 721 in the touch sensor chip 720 includes at least four input ends. The four input ends of the differential amplifier 721 are connected to four sensing electrodes Ym, Ym+1, Yn and Yn+1 of the touch sensor Ts, respectively. The input ends of the differential amplifier 721 are denoted by nodes A, B, D and E, respectively.

The differential amplifier 721 further includes a comparator Com. The comparator Com includes two input ends C and F and two output ends. Each of the input ends C and F is connected to two parallel sensing electrodes of the four sensing electrodes Ym, Ym+1, Yn and Yn+1 through ones of respective serial capacitors Cs which includes Cs1, Cs2, Cs3 and Cs4. The input ends of the node C in the comparator Com is connected to two sensing electrodes Ym and Yn in the touch sensor Ts which are not adjacent to each other. The input node C is connected to the sensing electrodes Ym and Yn through the serial capacitors Cs1 and Cs2, respectively.

The input ends of the node F in the comparator Com is connected to two sensing electrodes Ym+1 and Yn+1 which are not adjacent to each other. The two sensing electrodes Ym and Yn connected to the node C and the two sensing electrodes Ym+1 and Yn+1 connected to the node F may be adjacent to each other, respectively. The input end of the node F is connected to the sensing electrodes Ym+1 and Yn+1 through the serial capacitors Cs4 and Cs3, respectively.

An output value Vout of the comparator Com is a voltage difference between two output terminals of the two output ends of the comparator Com. Each of the output terminals is connected to a corresponding one of the input ends C and F by a feedback capacitor Ci. The two output terminals of the output ends may be connected to each other by a switch SW7.

The input end of the differential amplifier 721 is connected to a reference voltage source having a reference voltage Vref by each corresponding one of switches SW1, SW2, SW3 and SW4. The reference voltage Vref may initialize the serial capacitor Cs in an initialization step. In addition, the input end of the comparator Com may be connected to an end applied with the common voltage Vcm through each corresponding one of switches SW5 and SW6.

The switches SW1, SW2, SW3, SW4, SW5, SW6 and SW7 of the differential amplifier 721 may be off state during a period of detecting whether the touch sensor Ts is touched, and be on state in the initialization step.

The circuit diagram of FIG. 4 exemplifying the comparator Com is a circuit configuration of a differential amplifier which multiplies (i.e., amplifies) a difference value between signals applied to the input ends of the comparator Com by using a gain (Cs/Ci). However, this is only given by way of an example and the present inventive concept may be applied to any circuit capable of differential amplification.

In FIG. 5, output waveforms A, B, D and E of the four sensing electrodes Ym, Ym+1, Yn and Yn+1 and drive waveforms of the input/output nodes C, F and Vout of the comparator Com, which are illustrated in FIG. 4, are shown.

The touch detection signal output from the touch driver 710 is applied to the transmitting electrode TX.

The touch detection signal transmitted to the transmitting electrode TX is transmitted to the sensing electrode Y through the mutual capacitor Cm.m. The sensing electrodes Yn+1, Yn, Ym+1 and Ym are arranged in the order of a distance from the input end of the transmitting electrode TX.

The sensing electrode Ym is a signal wiring which is farthest from the touch driver 710. A touch detection signal output through the sensing electrode Ym is a signal which is most distorted due to the parasitic component of the transmitting electrode TX. A signal waveform of the node A connected to the sensing electrode Ym shows a pulse wave in which a rising edge and a falling edge has a gentle slope right after a transition timing of the touch detection signal.

The sensing electrode Yn is a signal wiring which is relatively close to the touch driver 710 than the sensing electrode Ym. The touch detection signal output through the sensing electrode Yn is a signal which is distorted relatively less than the touch detection signal output through the sensing electrode Ym. A signal waveform of the node B connected to the sensing electrode Yn shows a pulse wave having a steep rising edge and a steep falling edge than the signal waveform of the node A.

The sensing electrode Yn+1 is a signal wiring which is adjacent to the sensing electrode Yn and more close to the touch driver 710 than the sensing electrode Yn. A signal waveform of the node D connected to the sensing electrode Yn+1 shows a pulse wave having a steep rising edge and a steep falling edge than the signal wave form of the node B which is similar to the slope of the input TX touch detection signal.

The sensing electrode Ym+1 is a signal wiring which is disposed between the sensing electrode Ym and Yn, and located relatively far from the touch driver 710 A signal waveform of the node E connected to the sensing electrode Ym+1 shows a pulse wave in which a rising edge and a falling edge has a gentle slope right after the transition timing of the touch detection signal.

One end of the serial capacitor Cs1 is connected to the node A and another end thereof is connected to the node C, which is one of the input ends of the comparator Com. One end of the serial capacitor Cs2 is connected to the node B and another end thereof is connected to the node C, which is one of the input ends of the comparator Com. A waveform of the node C, which is one of the input ends of the comparator Com, is a waveform obtained by combining the waveforms of the node A and the node B which is transmitted through the serial capacitors Cs1 and Cs2, respectively. Similarly, a waveform of the node F, which is another of the input ends of the comparator Com, is a waveform obtained by combining the waveforms of the node D and the node E which is transmitted through the serial capacitors Cs3 and Cs4, respectively.

The output value Vout of the comparator Com is obtained by subtracting a value of the node C from a value of the node F and amplifying the difference between the value of the node C and the value of the node F. In the waveform of FIG. 5, the waveform of the node F and the waveform of the node C are substantially equal to each other, and the output value Vout of the comparator Com has a waveform having a zero electric potential.

The switches SW1, SW2, SW3, SW4, SW5, SW6 and SW7 illustrated in the circuit diagram of FIG. 4 may be collectively controlled by one control signal SW. All of the switches SW1, SW2, SW3, SW4, SW5, SW6 and SW7 may be off state in a period in which the touch detection signal is applied to the transmitting electrode TX and the position where the user touches is detected, and may be on state in the initialization period.

Figure 6:
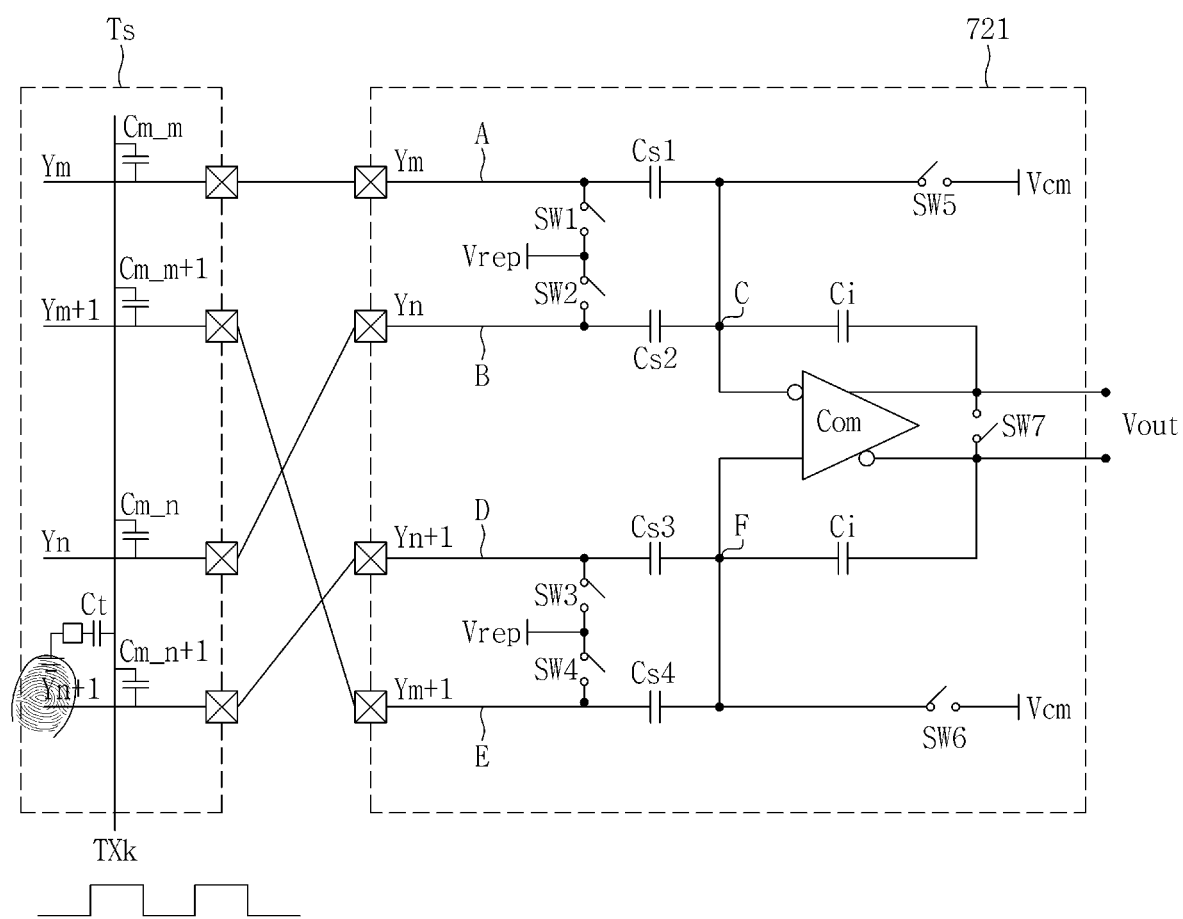
FIG. 6 is a circuit diagram illustrating a touch signal detector of a touch sensor chip according to an exemplary embodiment.

FIG. 6 is a circuit diagram illustrating a touch signal detector of a touch sensor chip according to an exemplary embodiment.

Figure 7:
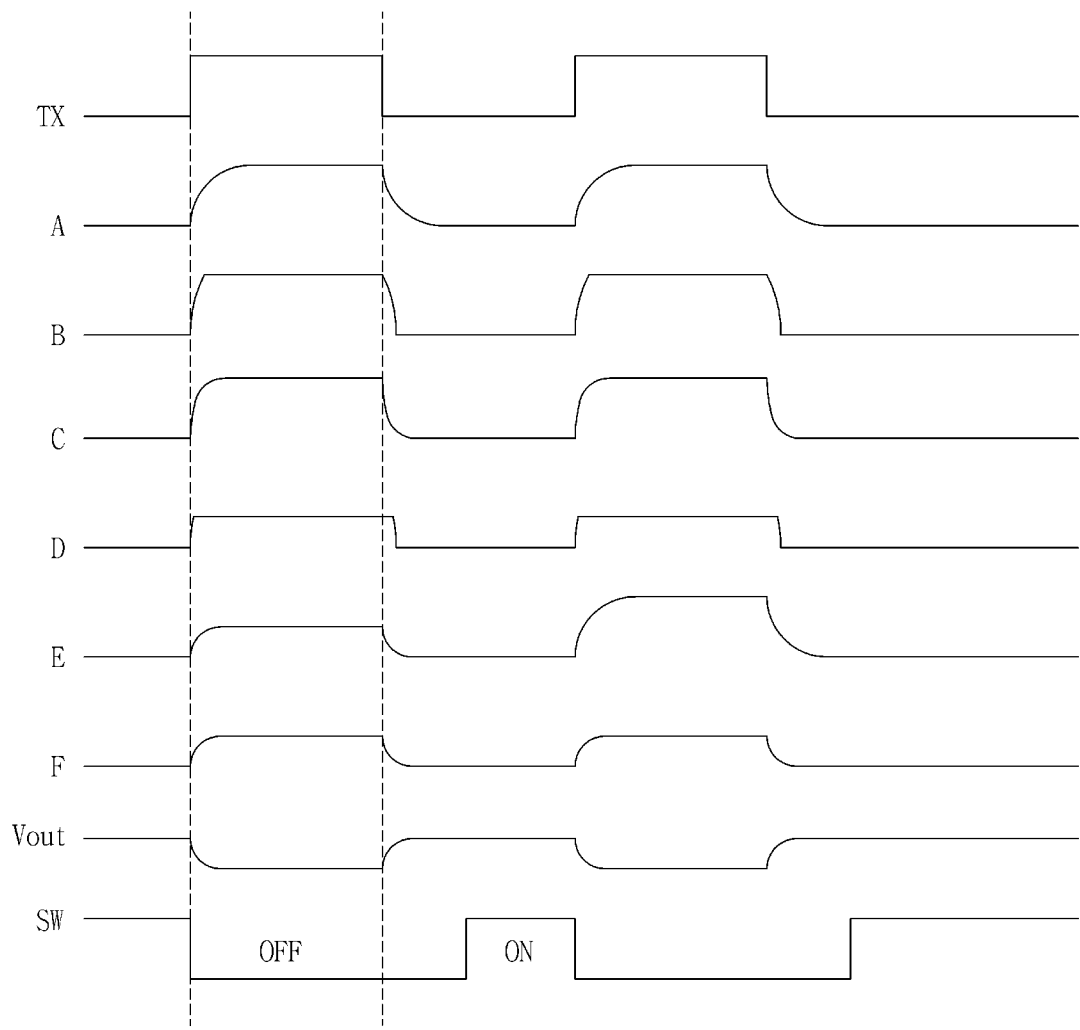
FIG. 7 is an exemplary waveform diagram illustrating a differential amplifier for detecting a touch in the circuit diagram of FIG. 6.

FIG. 7 is an exemplary waveform diagram illustrating a differential amplifier for detecting a touch in the circuit diagram of FIG. 6.

FIG. 6 illustrates a state in which the user touches a point where the transmitting electrode TXk crosses the sensing electrode Yn+1.

In a touch standby state, the touch detection signal is transmitted from the transmitting electrode TXk to the sensing electrode Yn+1 through a mutual capacitor Cm_n+1. Transmission of a pulse signal through a serial capacitor is possible by virtue of alternating current (AC) transmission characteristics of a capacitor. A capacitor is capable of transmitting an AC signal based on a change in an amount of electric charges charged to opposite end electrodes.

As illustrated in FIG. 6, when the user touches the point where the transmitting electrode TXk crosses the sensing electrode Yn+1, a touch capacitor Ct is formed between the transmitting electrode TXk and a touch object such as a user's finger. The touch detection signal is transmitted to the sensing electrode Yn+1 through the mutual capacitor Cm_n+1 and is also distributed to the touch capacitor Ct at the same time.

Accordingly, the touch detection signal output from the sensing electrode Yn+1 has a signal waveform having a voltage lower than a voltage of the standby state when no touch occurs.

Referring to FIG. 7, the input waveform of the node D connected to the sensing electrode Yn+1 is a pulse wave having a voltage lower than a voltage of an input waveform in the standby state. As the voltage of the signal waveform of the node D is reduced, the signal waveform of the node F is also detected as a signal waveform having a voltage which is lower than the voltage in the standby state.

The output value Vout of the comparator Com is obtained by subtracting the signal waveform of the node C from the signal waveform of the node F and amplifying it. As the voltage of the node F is reduced, the output value Vout is output as a signal waveform having a negative voltage.

Figure 8:
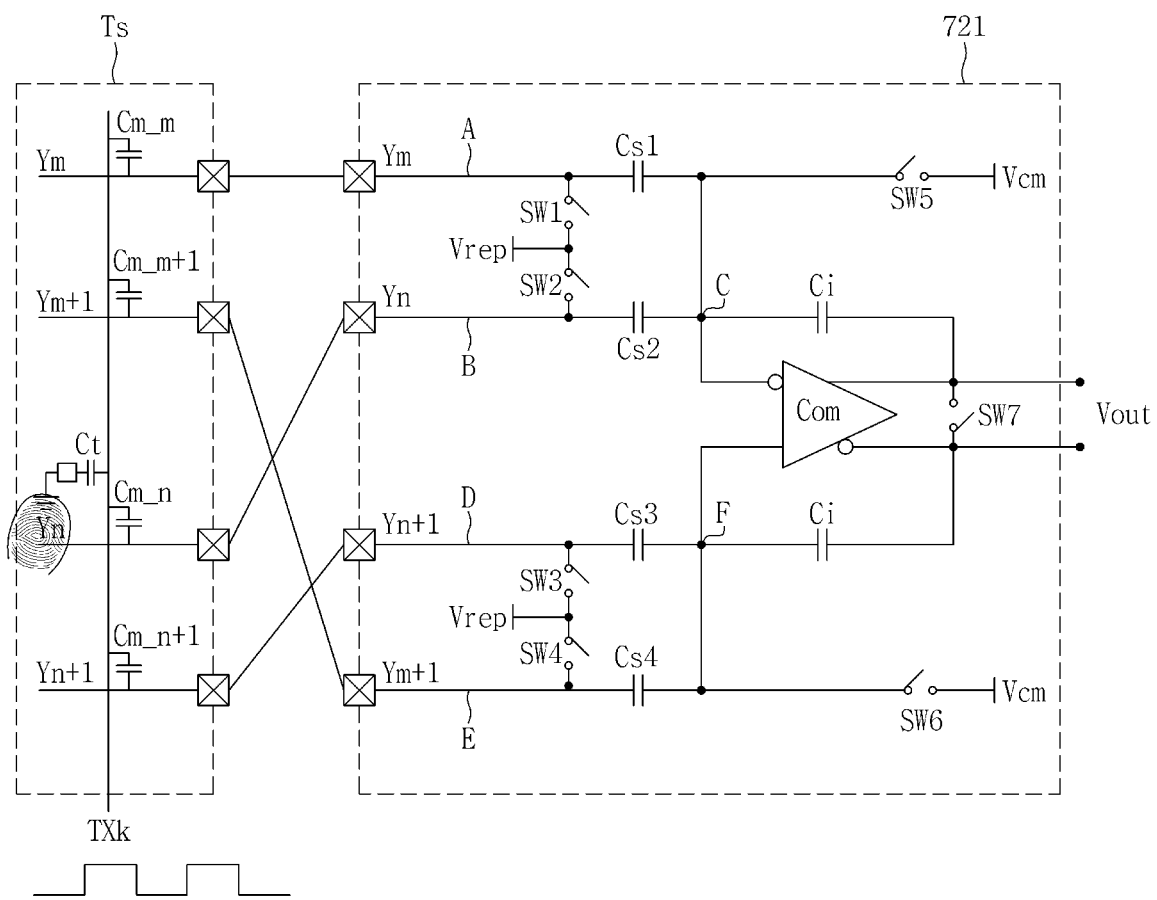
FIG. 8 is a circuit diagram illustrating a touch signal detector of a touch sensor chip according to an exemplary embodiment.

FIG. 8 is a circuit diagram illustrating a touch signal detector of a touch sensor chip according to an exemplary embodiment.

Figure 9:
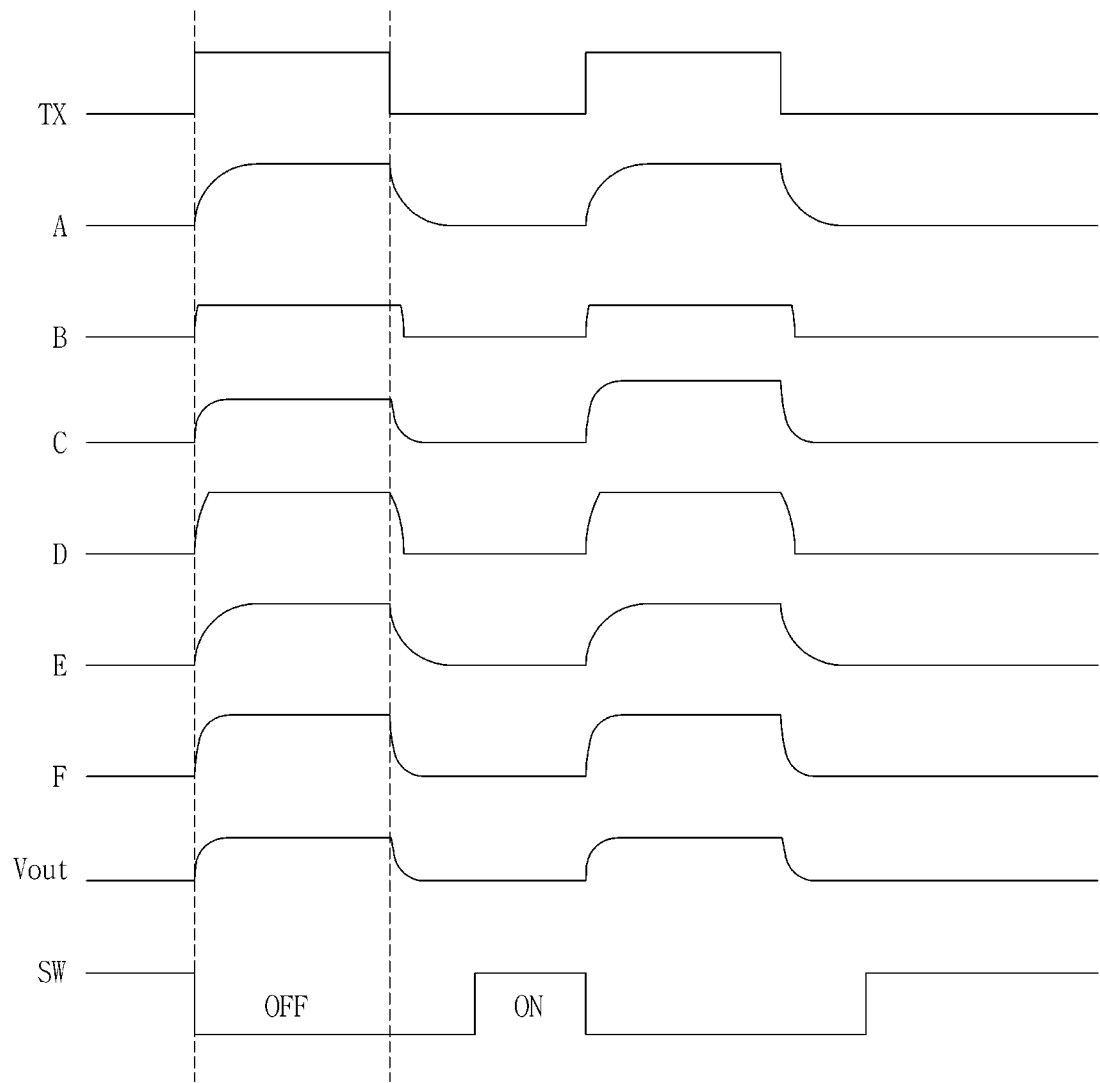
FIG. 9 is an exemplary waveform diagram illustrating a differential amplifier for detecting a touch in the circuit diagram of FIG. 8.

FIG. 9 is an exemplary waveform diagram illustrating a differential amplifier for detecting a touch in the circuit diagram of FIG. 8.

FIG. 8 illustrates a state in which the user touches a point where the transmitting electrode TXk crosses the sensing electrode Yn. When the user touches the point where the transmitting electrode TXk crosses the sensing electrode Yn, a touch capacitor Ct is formed between the transmitting electrode TXk and a touch object such as a user's finger. The touch detection signal output from the sensing electrode Yn has a waveform having a voltage which is relatively lower due to the touch capacitor Ct.

Referring to FIG. 9, when a touch occurs on the sensing electrode Yn, the input waveform of the node B connected to the sensing electrode Yn becomes a waveform having a voltage lower than the voltage in the standby state.

As the voltage of the waveform of the node B is reduced, the signal waveform of the node C is also formed as a signal waveform having a voltage which is lower than the voltage in the standby state.

The output value Vout of the comparator Com is obtained by subtracting the signal waveform of the node C from the signal waveform of the node F and amplifying it. As the voltage of the node C is reduced, the output value Vout is output as a signal waveform having a positive voltage.

Figure 10:
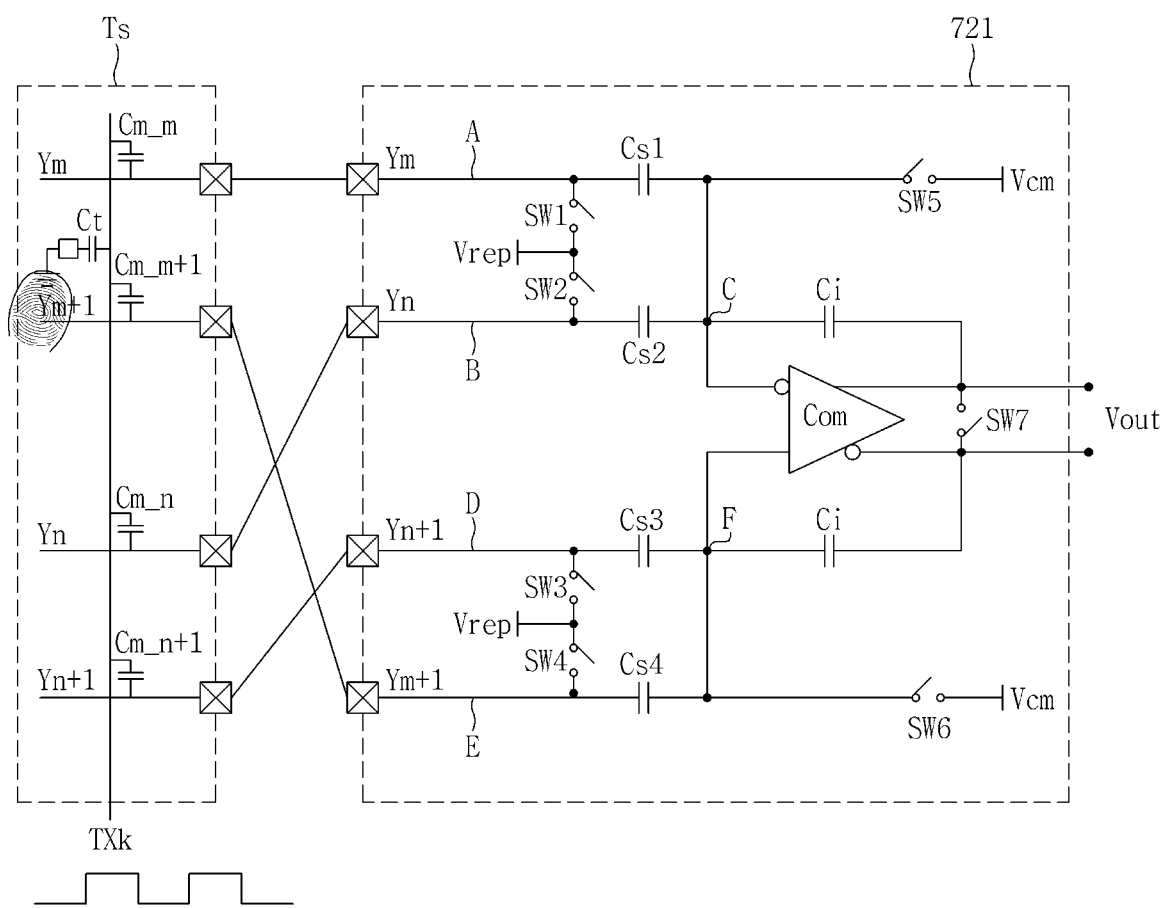
FIG. 10 is a circuit diagram illustrating a touch signal detector of a touch sensor chip according to an exemplary embodiment.

FIG. 10 is a circuit diagram illustrating a touch signal detector of a touch sensor chip according to an exemplary embodiment.

Figure 11:
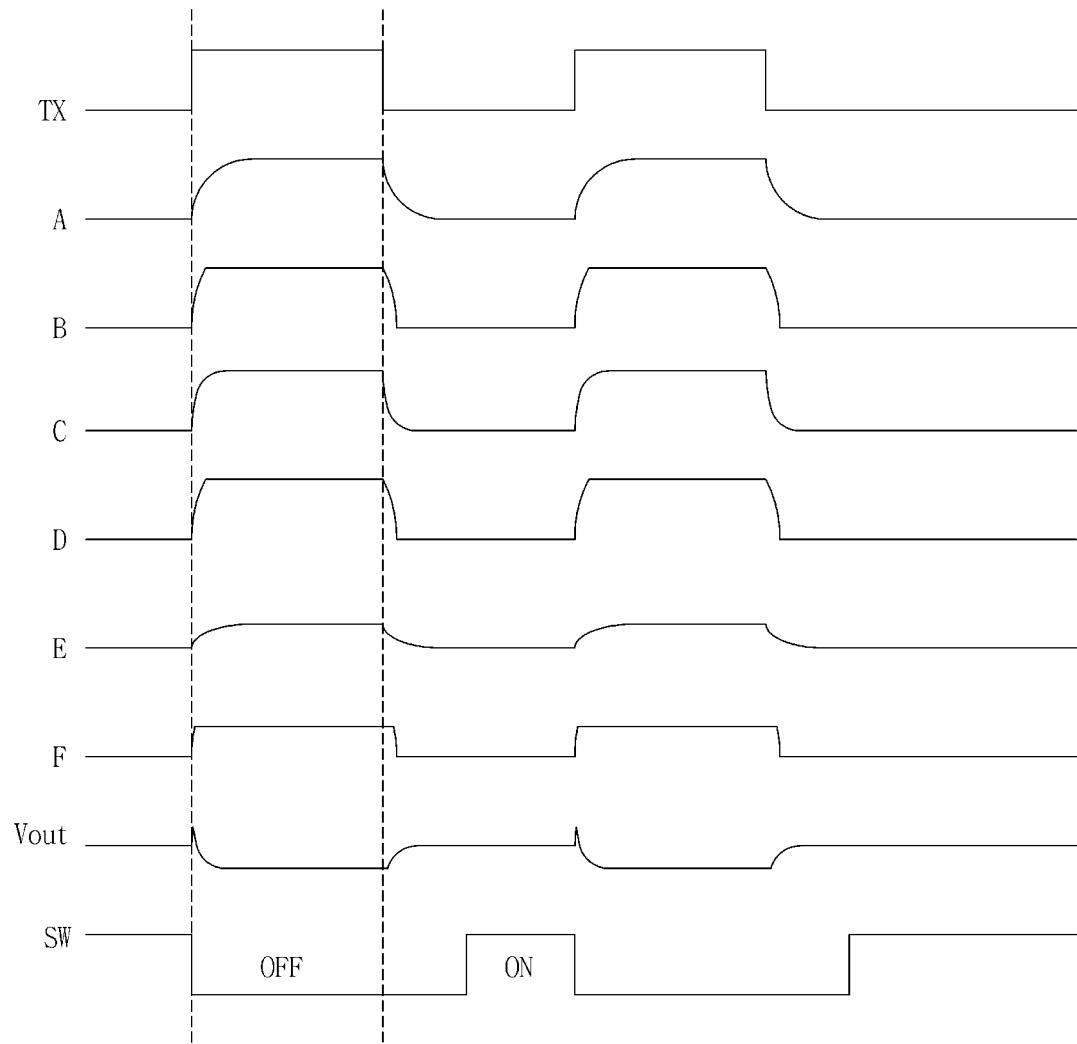
FIG. 11 is an exemplary waveform diagram illustrating a differential amplifier for detecting a touch in the circuit diagram of FIG. 10.

FIG. 11 is an exemplary waveform diagram illustrating a differential amplifier for detecting a touch in the circuit diagram of FIG. 10.

FIG. 10 illustrates a state in which the user touches a point where the transmitting electrode TXk crosses the sensing electrode Ym+1. When the user touches the point where the transmitting electrode TXk crosses the sensing electrode Ym+1, a touch capacitor Ct is formed between the transmitting electrode TXk and a touch object such as a user's finger. The touch detection signal output from the sensing electrode Ym+1 has a waveform having a voltage which is relatively lower due to the touch capacitor Ct.

Referring to FIG. 11, when a touch occurs on the sensing electrode Ym+1, the input waveform of the node E connected to the sensing electrode Ym+1 becomes a waveform having a voltage lower than the voltage in the standby state.

As the voltage of the waveform of the node E is reduced, the signal waveform of the node F is also formed as a signal waveform having a voltage which is lower than the voltage in the standby state.

The output value Vout of the comparator Com is obtained by subtracting the signal waveform of the node C from the signal waveform of the node F and amplifying it. As the voltage of the node F is reduced, the output value Vout is output as a signal waveform having a negative voltage. As the voltage of the node F rises rapidly with a steep slope right after the transition timing of the touch detection signal, the output value Vout may have a signal waveform having a positive glitch right after the transition timing of the touch detection signal.

Figure 12:
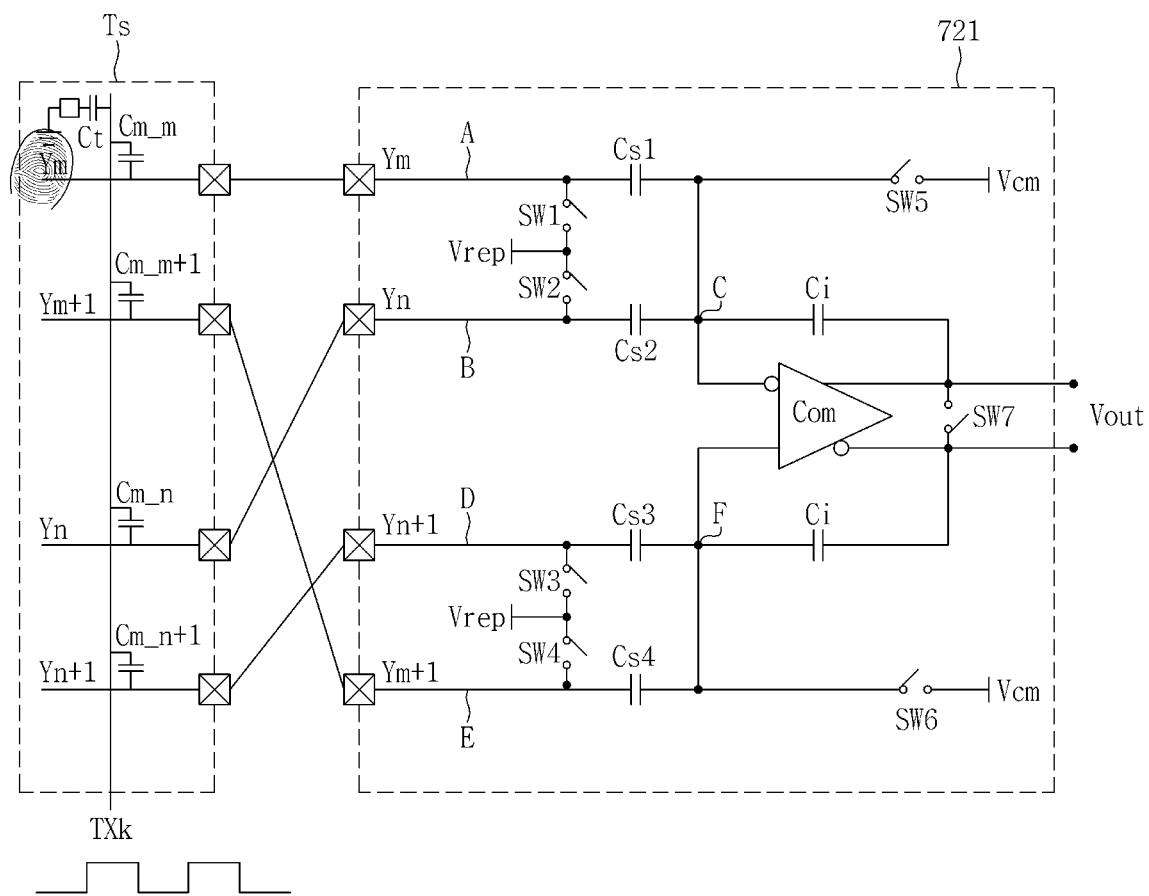
FIG. 12 is a circuit diagram illustrating a touch signal detector of a touch sensor chip according to an exemplary embodiment.

FIG. 12 is a circuit diagram illustrating a touch signal detector of a touch sensor chip according to an exemplary embodiment.

Figure 13:
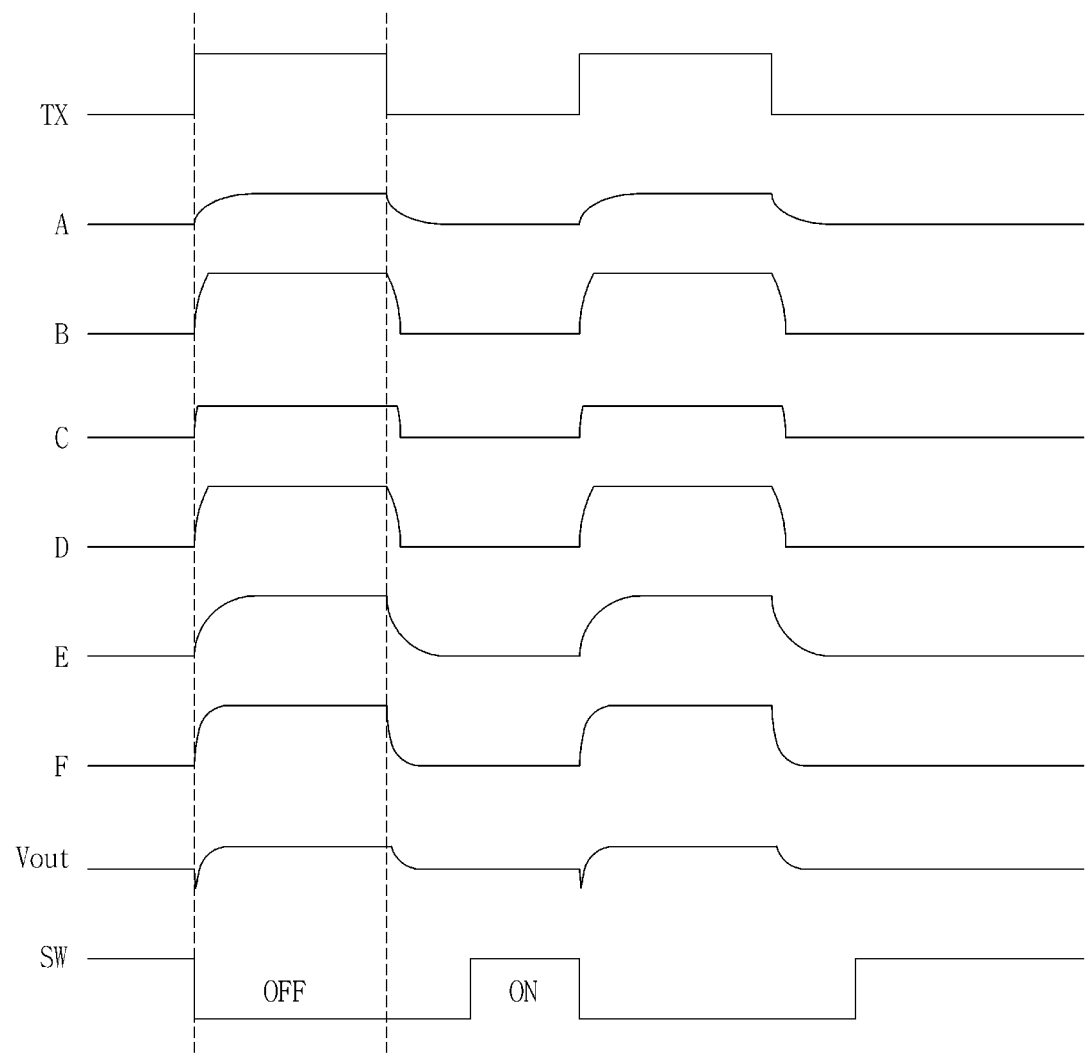
FIG. 13 is an exemplary waveform diagram illustrating a differential amplifier for detecting a touch in the circuit diagram of FIG. 12.

FIG. 13 is an exemplary waveform diagram illustrating a differential amplifier for detecting a touch in the circuit diagram of FIG. 12.

FIG. 12 illustrates a state in which the user touches a point where the transmitting electrode TXk crosses the sensing electrode Ym. When the user touches the point where the transmitting electrode TXk crosses the sensing electrode Ym, a touch capacitor Ct is formed between the transmitting electrode TXk and a touch object such as a user's finger. The touch detection signal output from the sensing electrode Ym has a waveform having a voltage which is relatively lower due to the touch capacitor Ct.

Referring to FIG. 13, when a touch occurs on the sensing electrode Ym, the input waveform of the node A connected to the sensing electrode Ym becomes a waveform having a voltage lower than the voltage in the standby state.

As the voltage of the waveform of the node A is reduced, the signal waveform of the node C is also formed into a signal waveform having a voltage lower than the voltage in the standby state.

The output value Vout of the comparator Com is obtained by subtracting the signal waveform of the node C from the signal waveform of the node F and amplifying it. As the voltage of the node C is reduced, the output value Vout may have a positive pulse waveform having a negative glitch right after the transition timing of the touch detection signal.

Referring to FIGS. 2 to 13, the touch determinator 722 may determine a touch state of the four sensing electrodes Ym, Ym+1, Yn and Yn+1 by analyzing the shape of the signal waveform of the output value Vout of the comparator Com.

Figure 14:
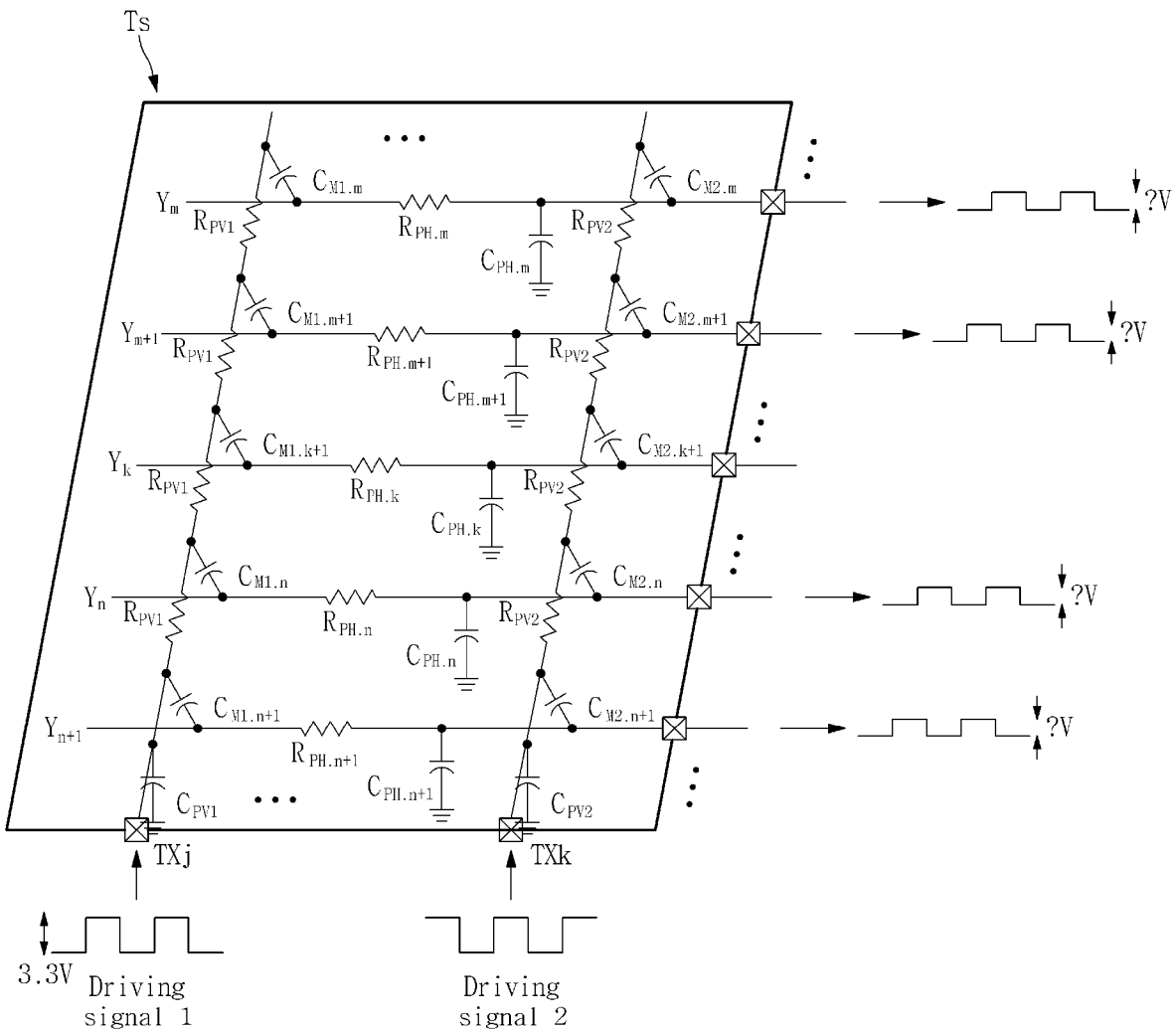
FIG. 14 is an equivalent circuit diagram illustrating a touch sensor according to an alternative exemplary embodiment.

FIG. 14 is an equivalent circuit diagram illustrating a touch sensor according to an alternative exemplary embodiment.

Referring to FIG. 14, a touch sensor Ts includes a plurality of transmitting electrodes TXj and TXk, and sensing electrodes Y which are orthogonal to the plurality of transmitting electrodes TXj and TXk. Although not illustrated, a sensor electrode pattern may be provided on an opposing surface of each of the electrodes at a point where the transmitting electrodes TXj and TXk cross the sensing electrodes Y.

Parasitic resistors RPV1 and RPV2 are formed along an extension direction of the transmitting electrodes TXj and TXk. The transmitting electrodes TXj and TXk receive touch detection signals from a touch driver (not illustrated). In such an exemplary embodiment, touch detection signals, e.g., a driving signal 1 and a driving signal 2, having different phases are substantially simultaneously applied to the transmitting electrodes TXj and TXk which are spaced apart from each other. For example, the touch detection signals, e.g., the driving signal 1 and the driving signal 2, having a phase delay of about 180 degrees are applied substantially simultaneously.

The touch detection signals, e.g., the driving signal 1 and the driving signal 2 applied to the plurality of transmitting electrodes TXj and TXk are transmitted to the sensing electrode Y through the mutual capacitor Cm.m. A parasitic resistor RPH and a parasitic capacitor CPH are formed at the sensing electrode Y along the extension direction. A voltage drop and a signal delay may be caused by the parasitic resistor RPH and the parasitic capacitor CPH while the touch detection signal passes through the sensing electrode Y.

Figure 15:
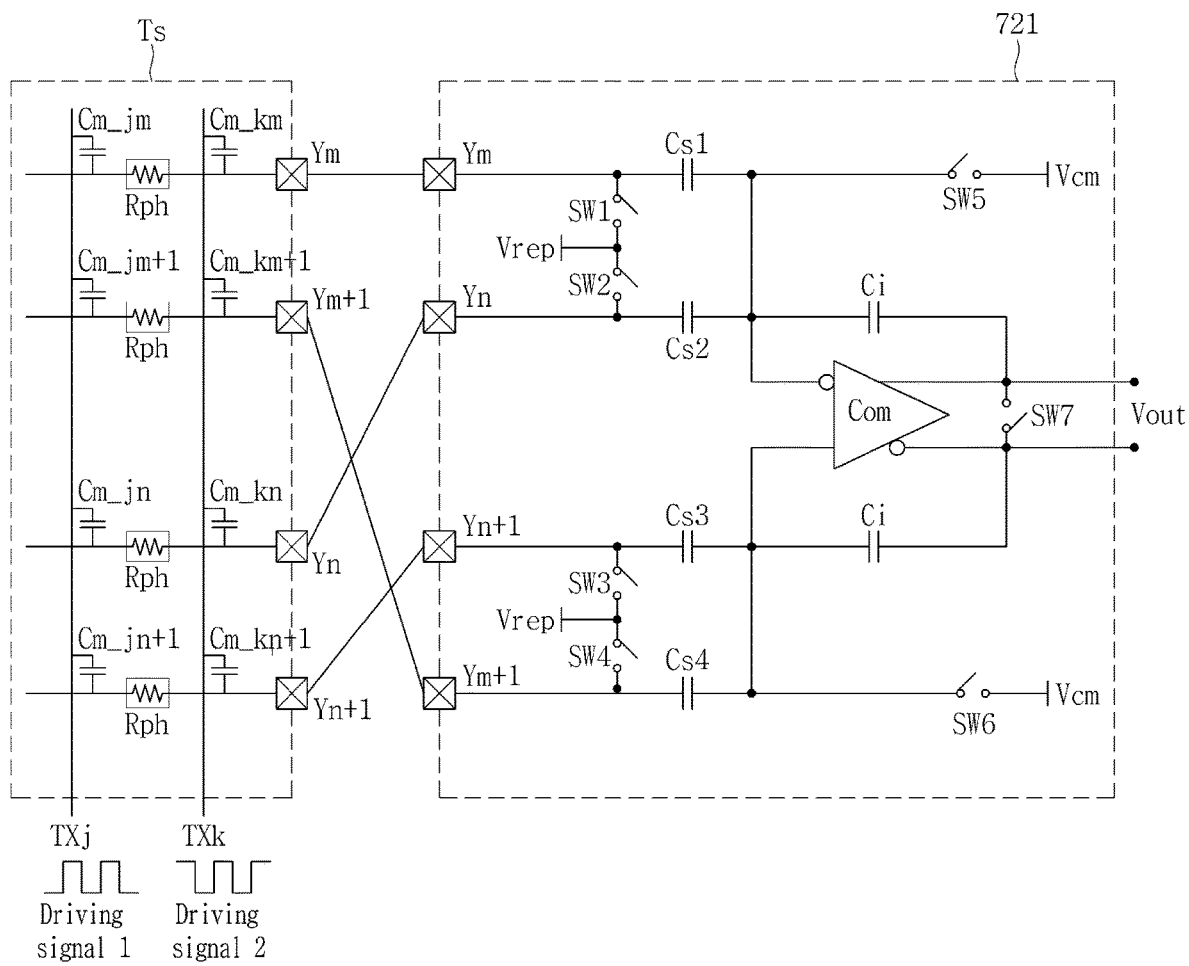
FIG. 15 is a circuit diagram illustrating a differential amplifier of a touch sensor chip according to an alternative exemplary embodiment.

FIG. 15 is a circuit diagram illustrating a differential amplifier of a touch sensor chip according to an alternative exemplary embodiment.

Referring to FIG. 15, a differential amplifier 721 of a touch sensor chip 720 includes four input ends. The four input ends of the differential amplifier 721 are connected to sensing electrodes Ym, Ym+1, Yn and Yn+1 of the touch sensor Ts, respectively.

The differential amplifier 721 further includes a comparator Com. The comparator Com includes two input ends and two output ends and each of the input ends is connected to two parallel sensing electrodes of the four sensing electrodes Ym, Ym+1, Yn and Yn+1 through ones of respective serial capacitors Cs1, Cs2, Cs3 and Cs4. One of the input ends in the comparator Com is connected to two sensing electrodes Ym and Yn which are not adjacent to each other in the touch sensor Ts. Said one of the input ends is connected to the sensing electrodes Ym and Yn through the serial capacitors Cs1 and Cs2, respectively.

The other of the input ends in the comparator Com is connected to the other two sensing electrodes Ym+1 and Yn+1 which are not adjacent to each other. The two sensing electrodes Ym and Yn connected to one of the input ends and the two sensing electrodes Ym+1 and Yn+1 connected to the other of the input ends may be adjacent each other, respectively. Said the other of the input ends is connected to the sensing electrodes Ym+1 and Yn+1 through the serial capacitors Cs4 and Cs3, respectively.

An output value Vout of the comparator Com is a voltage difference between two output terminals of the two output ends of the comparator Com. Each of the output terminals is connected to a corresponding one of the input ends of the comparator Com by a feedback capacitor Ci. The two output terminals of the output ends may be connected to each other by a switch SW7.

The input end of the differential amplifier 721 is connected to a reference voltage source having a reference voltage Vref through each corresponding one of switches SW1, SW2, SW3 and SW4, respectively. The reference voltage Vref may initialize the serial capacitor Cs which includes CS1, CS2, CS3 and CS4 in an initialization step. In addition, the input end of the comparator Com may be connected to an end applied with the common voltage Vcm through each corresponding one of switches SW5 and SW6.

The switches SW1, SW2, SW3, SW4, SW5, SW6 and SW7 of the differential amplifier 721 maintain an off state during a period of detecting whether the touch sensor Ts is touched, and an on state in the initialization step.

The circuit diagram of FIG. 15 exemplifying the comparator Com is a circuit configuration of a differential amplifier which multiplies (i.e., amplifies) a difference value between signals applied to the input ends of the comparator Com by a gain (Cs/Ci).

However, this is only given by way of an example and the present inventive concept may be applied to any circuit capable of differential amplification.

Figure 16:
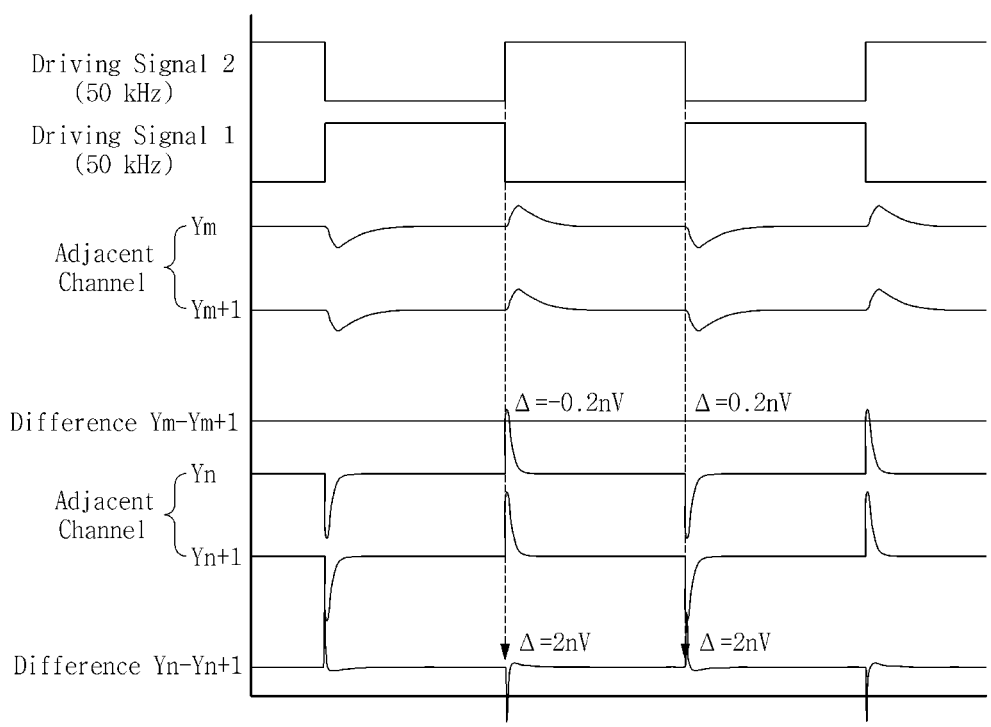
FIG. 16 is a standby state waveform diagram illustrating the differential amplifier illustrated in FIG. 15.

FIG. 16 is a standby state waveform diagram illustrating the differential amplifier illustrated in FIG. 15.

Referring to FIGS. 14, 15 and 16, a first touch detection signal (the driving signal 1) and a second touch detection signal (the driving signal 2) having a frequency of about 50 KHz and phases different from each other are applied to the transmitting electrodes TXj and TXk which are spaced apart from each other.

The first touch detection signal (the driving signal 1) and the second touch detection signal (the driving signal 2) applied to the transmitting electrodes TXj and TXk, respectively, are transmitted through the mutual capacitors Cm.m so as to be output to the sensing electrodes Y.

The sensing electrode Ym is located relatively far apart from input ends of the transmitting electrodes TXj and TXk. A mutual capacitor Cm_jm is formed at a point where the sensing electrode Ym crosses the transmitting electrode TXj. In addition, a mutual capacitor Cm_km is formed at a point where the sensing electrode Ym crosses the transmitting electrode TXk. A parasitic resistor RPH and a parasitic capacitor (not illustrated) are formed between the mutual capacitor Cm_jm and the mutual capacitor Cm_km along the sensing electrode Ym.

The first touch detection signal (the driving signal 1) is applied to the transmitting electrode TXj and is output to an output end of the sensing electrode Ym through a mutual capacitor Cm_jm. The transmission path of the first touch detection signal (the driving signal 1) includes the parasitic resistor RPH and the parasitic capacitor (not illustrated) of the sensing electrode Ym.

The second touch detection signal (the driving signal 2) is applied to the transmitting electrode TXk and is output to the output end of the sensing electrode Ym through a mutual capacitor Cm_km. The transmission path of the second touch detection signal (the driving signal 2) does not include the parasitic resistor RPH and the parasitic capacitor (not illustrated) of the sensing electrode Ym.

An output value of the first touch detection signal (the driving signal 1) and an output value of the second touch detection signal (the driving signal 2) are combined, and the combined value is output to the output end of the sensing electrode Ym. The second touch detection signal (the driving signal 2) which is not affected by the parasitic resistor RPH and the parasitic capacitor (not illustrated) is firstly output, and then the first touch detection signal (the driving signal 1) is output, as an output signal of the sensing electrode Ym. The output waveform of the sensing electrode Ym of FIG. 16 shows a signal waveform which falls and rises with a gentle slope right after a transition timing of the driving signals 1 and 2 due to the second touch detection signal (the driving signal 2) which is output prior to the first touch detection signal and relatively more affected by the parasitic components of the transmitting electrode.

The sensing electrode Ym+1 is a wiring which is disposed adjacent to the sensing electrode Ym. An output value of the sensing electrode Ym+1 is substantially equal to that of the sensing electrode Ym. Accordingly, when the output value of the sensing electrode Ym+1 is subtracted from the output value of the sensing electrode Ym, the difference value is significantly small as about 0.2 nV.

The sensing electrode Yn is located relatively close to the input ends of the transmitting electrode TXj and the transmitting electrode TXk. A mutual capacitor Cm_jn is formed at a point where the sensing electrode Yn crosses the transmitting electrode TXj. In addition, a mutual capacitor Cm_kn is formed at a point where the sensing electrode Yn crosses the transmitting electrode TXk. A parasitic resistor RPH and a parasitic capacitor (not illustrated) are formed between the mutual capacitor Cm_jn and the mutual capacitor Cm_kn along the sensing electrode Yn.

The first touch detection signal (the driving signal 1) is applied to the transmitting electrode TXj and is output to an output end of the sensing electrode Yn through the capacitor Cm_jn. The transmission path of the first touch detection signal (the driving signal 1) includes the parasitic resistor RPH of the sensing electrode Yn.

The second touch detection signal (the driving signal 2) is applied to the transmitting electrode TXk and is output to the output end of the sensing electrode Yn through the capacitor Cm_kn. The transmission path of the second touch detection signal (the driving signal 2) does not include the parasitic resistor RPH of the sensing electrode Yn.

An output value of the first touch detection signal (the driving signal 1) and an output value of the second touch detection signal (the driving signal 2) are combined, and the combined value is output to the output end of the sensing electrode Yn. The second touch detection signal (the driving signal 2) which is not affected by the parasitic resistor RPH and the parasitic capacitor (not illustrated) is firstly output, and then the first touch detection signal (the driving signal 1) is output, as an output signal of the sensing electrode Yn. In addition, the sensing electrode Yn outputs a signal waveform which falls and rises with a steep slope right after the transition timing of the driving signals 1 and 2 due to the second touch detection signal (the driving signal 2) which is output prior to the first touch detection signal and relatively less affected by the parasitic components.

The sensing electrode Yn+1 is a wiring which is disposed adjacent to the sensing electrode Yn. An output value of the sensing electrode Yn+1 is substantially the same as that of the sensing electrode Yn. Accordingly, when subtracting the output value of the sensing electrode Yn+1 from the output value of the sensing electrode Yn, the difference value is significantly small as about 2 nV.

Figure 17:
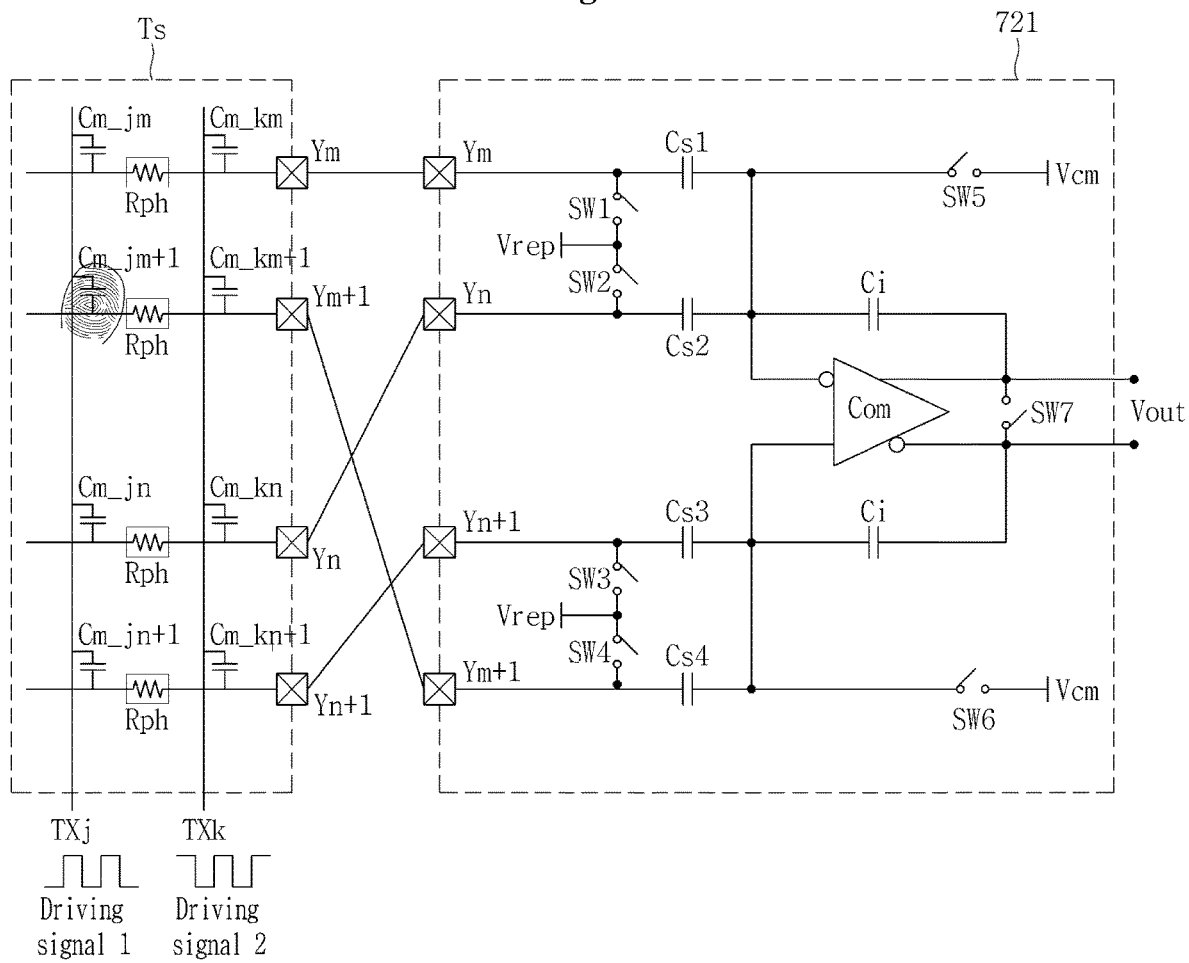
FIG. 17 is a circuit diagram illustrating a touch signal detector of a touch sensor chip according to an alternative exemplary embodiment.

FIG. 17 is a circuit diagram illustrating a touch signal detector of a touch sensor chip according to an alternative exemplary embodiment.

Figure 18:
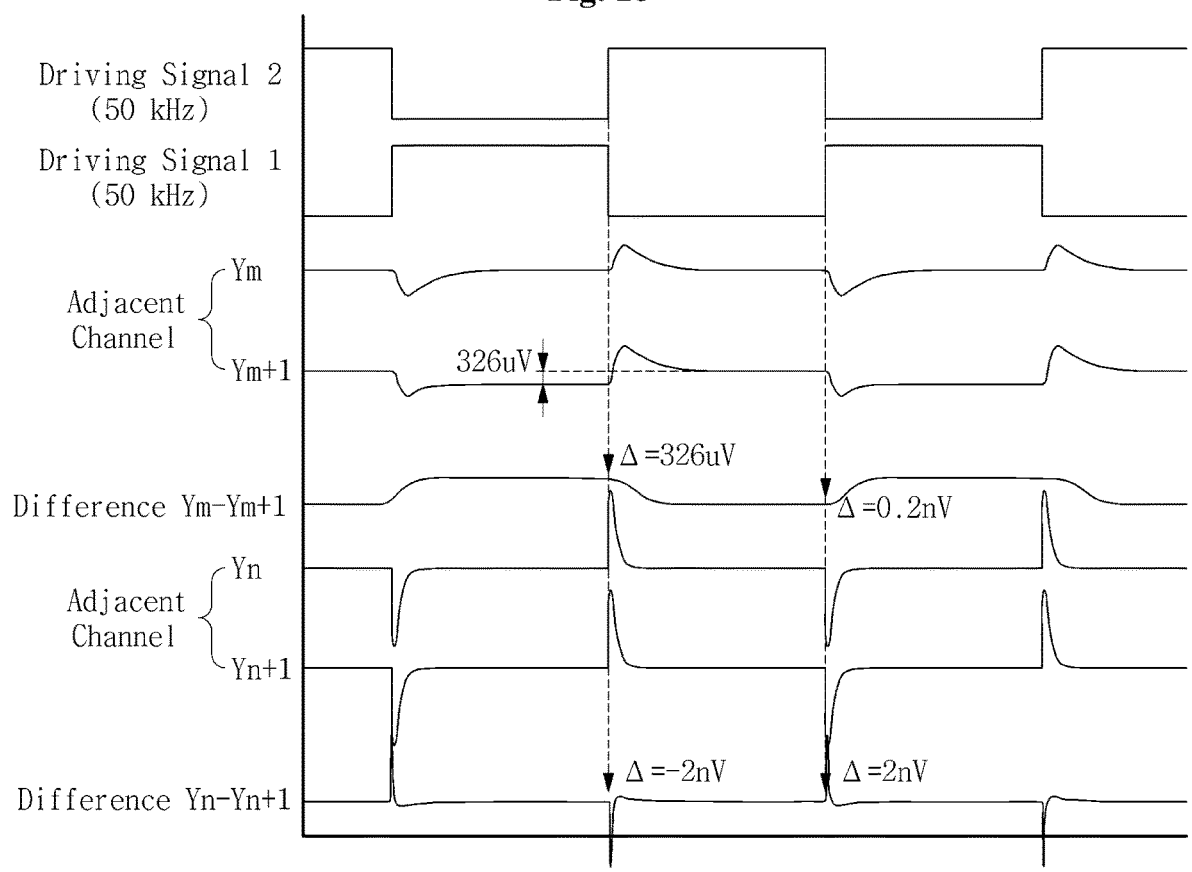
FIG. 18 is an exemplary waveform diagram illustrating a sensing electrode for detecting a touch in the circuit diagram of FIG. 17.

FIG. 18 is an exemplary waveform diagram illustrating a sensing electrode for detecting a touch in the circuit diagram of FIG. 17.

FIGS. 17 and 18 illustrate a state in which the user touches a point where the transmitting electrode TXj crosses the sensing electrode Ym+1.

When the user touches the point where the transmitting electrode TXj crosses the sensing electrode Ym+1, a touch capacitor is formed between the transmitting electrode TXj and a touch object. The touch detection signal is transmitted to the touch object of the user through the touch capacitor and a signal power transmitted to the sensing electrode Ym+1 is reduced. Accordingly, the touch detection signal output from the sensing electrode Ym+1 has a signal waveform having a voltage which is lower than a voltage of the case where no touch occurs.

Referring to FIG. 18, the sensing electrodes Ym, Yn and Yn+1 where no touch occurs output touch detection signals substantially equal to those illustrated in FIG. 16.

On the other hand, the touched sensing electrode Ym+1 combines the first touch detection signal (the driving signal 1) transmitted through the transmitting electrode TXj and the second touch detection signal (the driving signal 2) transmitted through the transmitting electrode TXk and outputs the combined value.

The first touch detection signal (the driving signal 1) is applied to the transmitting electrode TXj and is output to an output end of the sensing electrode Ym+1 through a mutual capacitor Cm_jm+1. A part of a signal power of the first touch detection signal (the driving signal 1) is distributed to the touch capacitor (not illustrated) and then is output to the output end of the sensing electrode Ym+1. In addition, the transmission path of the first touch detection signal (the driving signal 1) includes a parasitic resistor RPH and a parasitic capacitor (not illustrated) of the sensing electrode Ym+1.

The second touch detection signal (the driving signal 2) is applied to the transmitting electrode TXk and is output to the output end of the sensing electrode Ym+1 through a mutual capacitor Cm_km+1. The transmission path of the second touch detection signal (the driving signal 2) does not include the parasitic resistor RPH and the parasitic capacitor (not illustrated) of the sensing electrode Ym+1.

A voltage of a smooth portion affected by the first touch detection signal (the driving signal 1) in the output waveform of the sensing electrode Ym+1 is reduced by about 326 μV as compared to the voltage in the standby state where no touch occurs, since the first touch detection signal (the driving signal 1) is attenuated by the touch capacitor.

Figure 19:
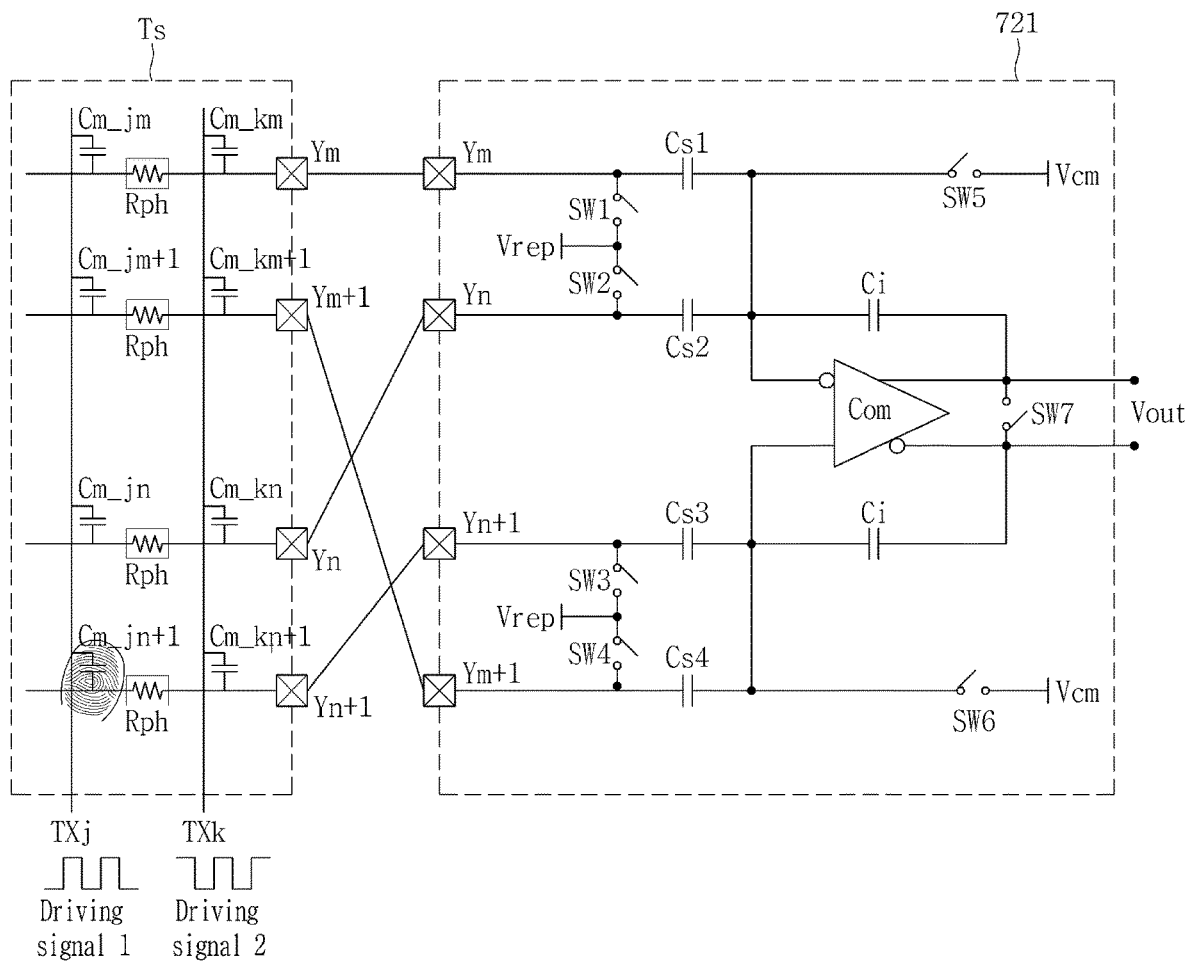
FIG. 19 is a circuit diagram illustrating a touch signal detector of a touch sensor chip according to an alternative exemplary embodiment.

FIG. 19 is a circuit diagram illustrating a touch signal detector of a touch sensor chip according to an alternative exemplary embodiment.

Figure 20:
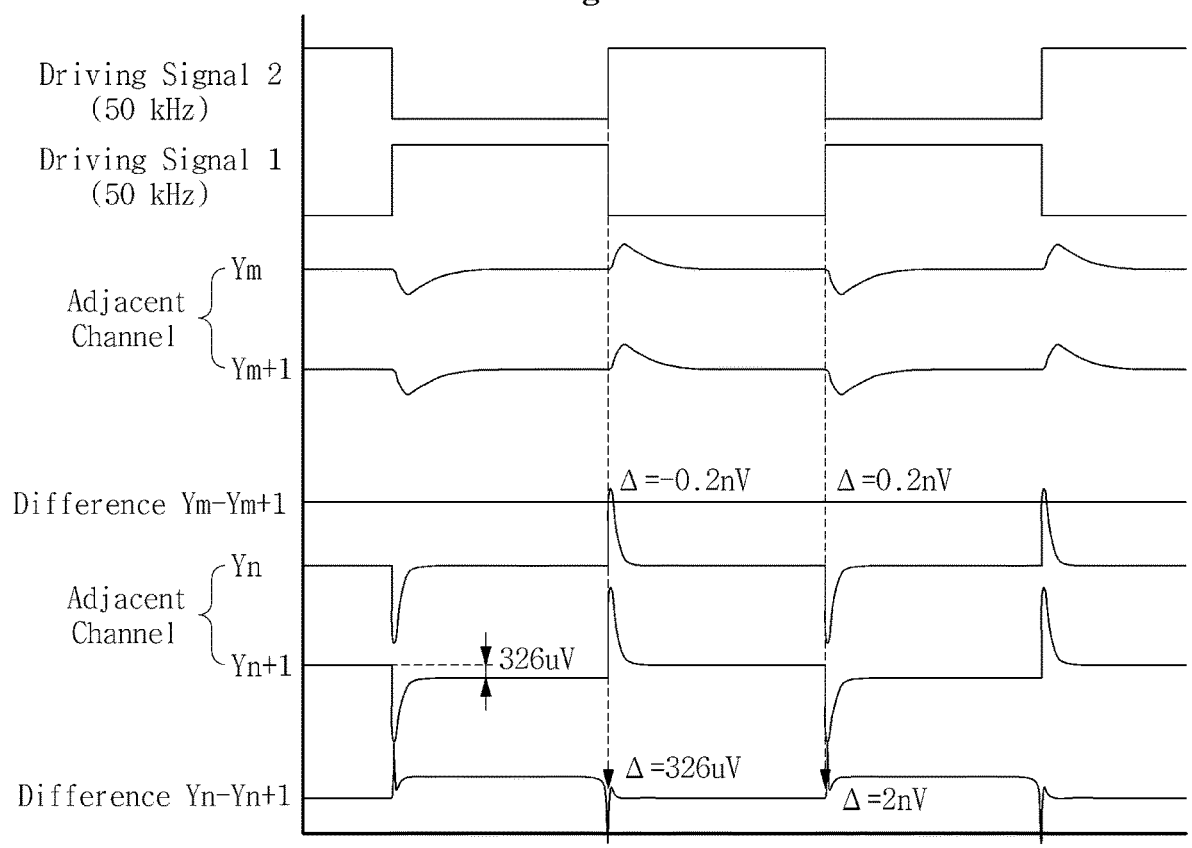
FIG. 20 is an exemplary waveform diagram illustrating a sensing electrode for detecting a touch in the circuit diagram of FIG. 19.

FIG. 20 is an exemplary waveform diagram illustrating a sensing electrode for detecting a touch in the circuit diagram of FIG. 19.

FIGS. 19 and 20 illustrate a state in which the user touches a point where the transmitting electrode TXj crosses the sensing electrode Yn+1.

When the user touches the point where the transmitting electrode TXj crosses the sensing electrode Yn+1, a touch capacitor is formed between the transmitting electrode TXj and a touch object. The touch detection signal is transmitted to the touch object of the user through the touch capacitor and a signal power transmitted to the sensing electrode Yn+1 is reduced. Accordingly, the touch detection signal output from the sensing electrode Yn+1 has a signal waveform having a voltage lower than a voltage of the case where no touch occurs.

Referring to FIG. 20, the sensing electrodes Ym, Ym+1 and Yn where no touch occurs output touch detection signals substantially equal to those illustrated in FIG. 16.

In an exemplary embodiment, an output value of the first touch detection signal (the driving signal 1) transmitted through the transmitting electrode TXj and an output value of the second touch detection signal (the driving signal 2) transmitted through the transmitting electrode TXk are combined, and the combined value is output to the output end of the sensing electrode Yn.

The first touch detection signal (the driving signal 1) is applied to the transmitting electrode TXj and is output to an output end of the sensing electrode Yn+1 through a mutual capacitor Cm_jn+1. A part of a signal power of the first touch detection signal (the driving signal 1) is distributed to the touch capacitor (not illustrated) and then is output to the output end of the sensing electrode Yn+1. In addition, the transmission path of the first touch detection signal (the driving signal 1) includes a parasitic resistor RPH and a parasitic capacitor (not illustrated) of the sensing electrode Yn+1.

The second touch detection signal (the driving signal 2) is applied to the transmitting electrode TXk and is output to the output end of the sensing electrode Yn+1 through a mutual capacitor Cm_kn+1. The transmission path of the second touch detection signal (the driving signal 2) does not include the parasitic resistor RPH and the parasitic capacitor (not illustrated) of the sensing electrode Yn+1.

A voltage of a smooth portion affected by the first touch detection signal (the driving signal 1) in the output waveform of the sensing electrode Yn+1 is reduced by about 326 μV as compared to the voltage in the standby state where no touch occurs, since the first touch detection signal (the driving signal 1) is attenuated by the touch capacitor.

Figure 21:
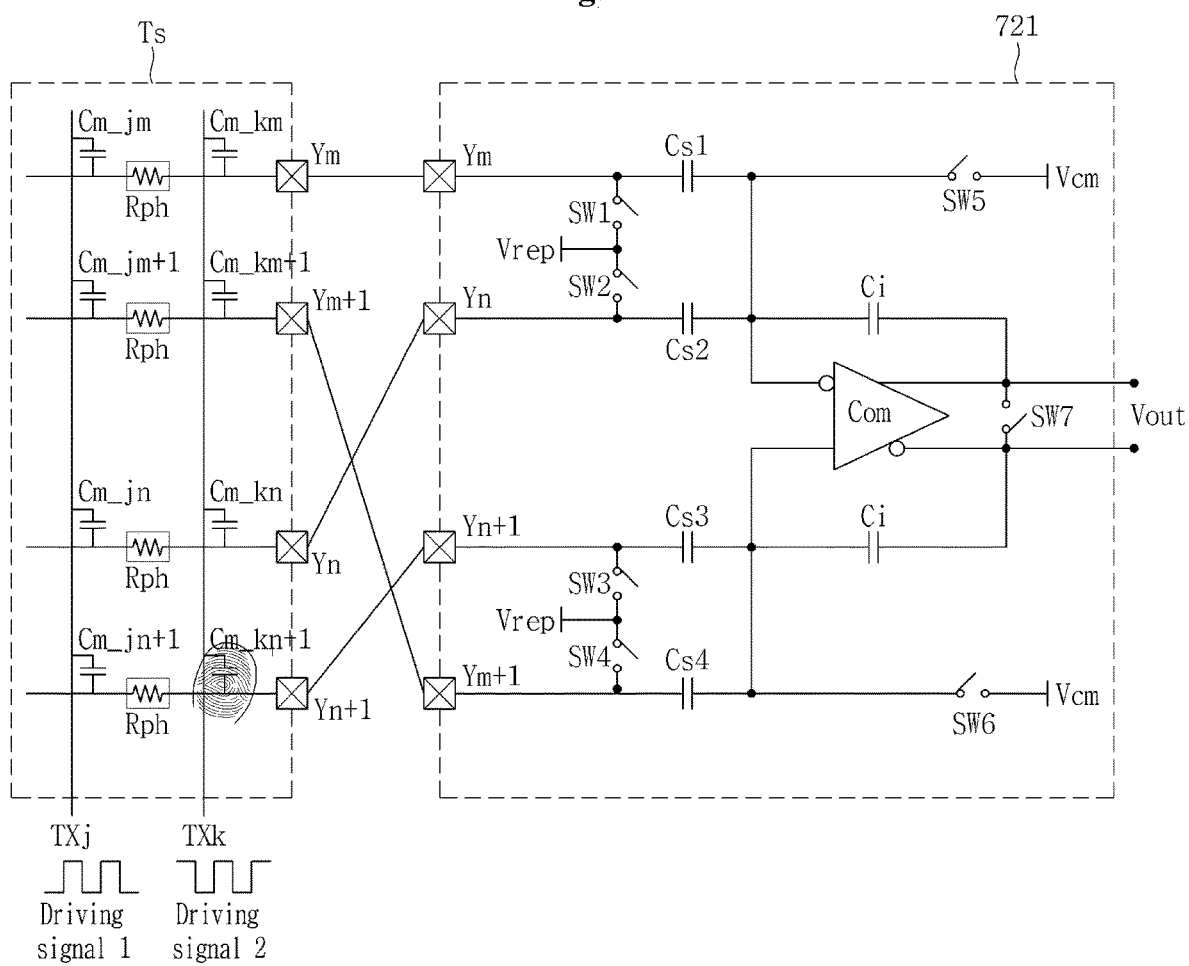
FIG. 21 is a circuit diagram illustrating a touch signal detector of a touch sensor chip according to an alternative exemplary embodiment.

FIG. 21 is a circuit diagram illustrating a touch signal detector of a touch sensor chip according to an alternative exemplary embodiment.

Figure 22:
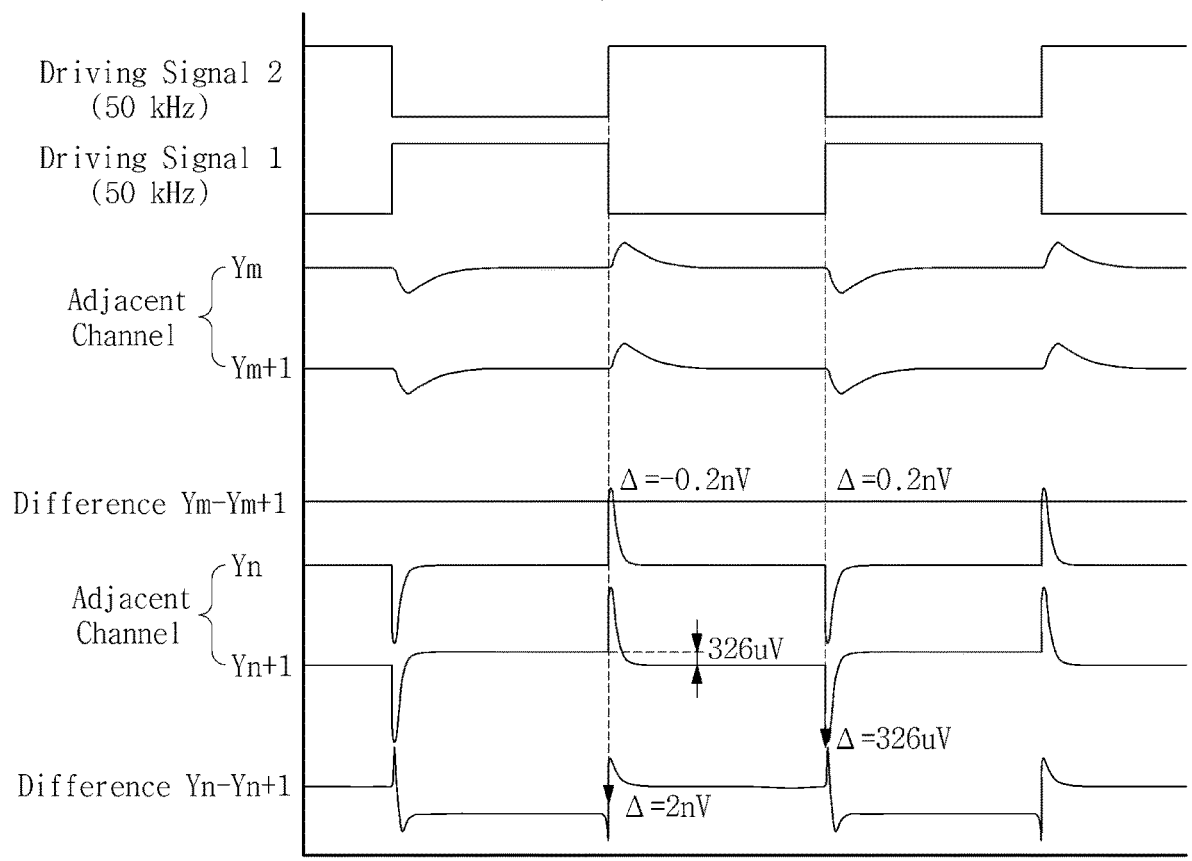
FIG. 22 is an exemplary waveform diagram illustrating a sensing electrode for detecting a touch in the circuit diagram of FIG. 21.

FIG. 22 is an exemplary waveform diagram illustrating a sensing electrode for detecting a touch in the circuit diagram of FIG. 21.

FIGS. 21 and 22 illustrate a state in which the user touches a point where the transmitting electrode TXk crosses the sensing electrode Yn+1.

When the user touches the point where the transmitting electrode TXk crosses the sensing electrode Yn+1, a touch capacitor is formed between the transmitting electrode TXk and a touch object. The touch detection signal is transmitted to the touch object of the user through the touch capacitor and a signal power transmitted to the sensing electrode Yn+1 is reduced. Accordingly, the touch detection signal output from the sensing electrode Yn+1 shows a signal waveform having a voltage lower than a voltage of the case where no touch occurs.

The first touch detection signal (the driving signal 1) is applied to the transmitting electrode TXj and is output to the output end of the sensing electrode Yn+1 through the mutual capacitor Cm_jn+1. The transmission path of the first touch detection signal (the driving signal 1) includes the parasitic resistor RPH and the parasitic capacitor (not illustrated) of the sensing electrode Yn+1.

The second touch detection signal (the driving signal 2) is applied to the transmitting electrode TXk and is output to the output end of the sensing electrode Yn+1 through the mutual capacitor Cm_km+1. A part of a signal power of the second touch detection signal (the driving signal 2) is distributed to a touch capacitor (not illustrated) and is output to the output end of the sensing electrode Yn+1. The transmission path of the second touch detection signal (the driving signal 2) does not include the parasitic resistor RPH and the parasitic capacitor (not illustrated) of the sensing electrode Yn+1.

A voltage of a smooth portion affected by the second touch detection signal (the driving signal 2) in the output waveform of the sensing electrode Yn+1 is reduced by about 326 μV as compared to the voltage in the standby state where no touch occurs, since the second touch detection signal (the driving signal 2) is attenuated by the touch capacitor.

Figure 23:
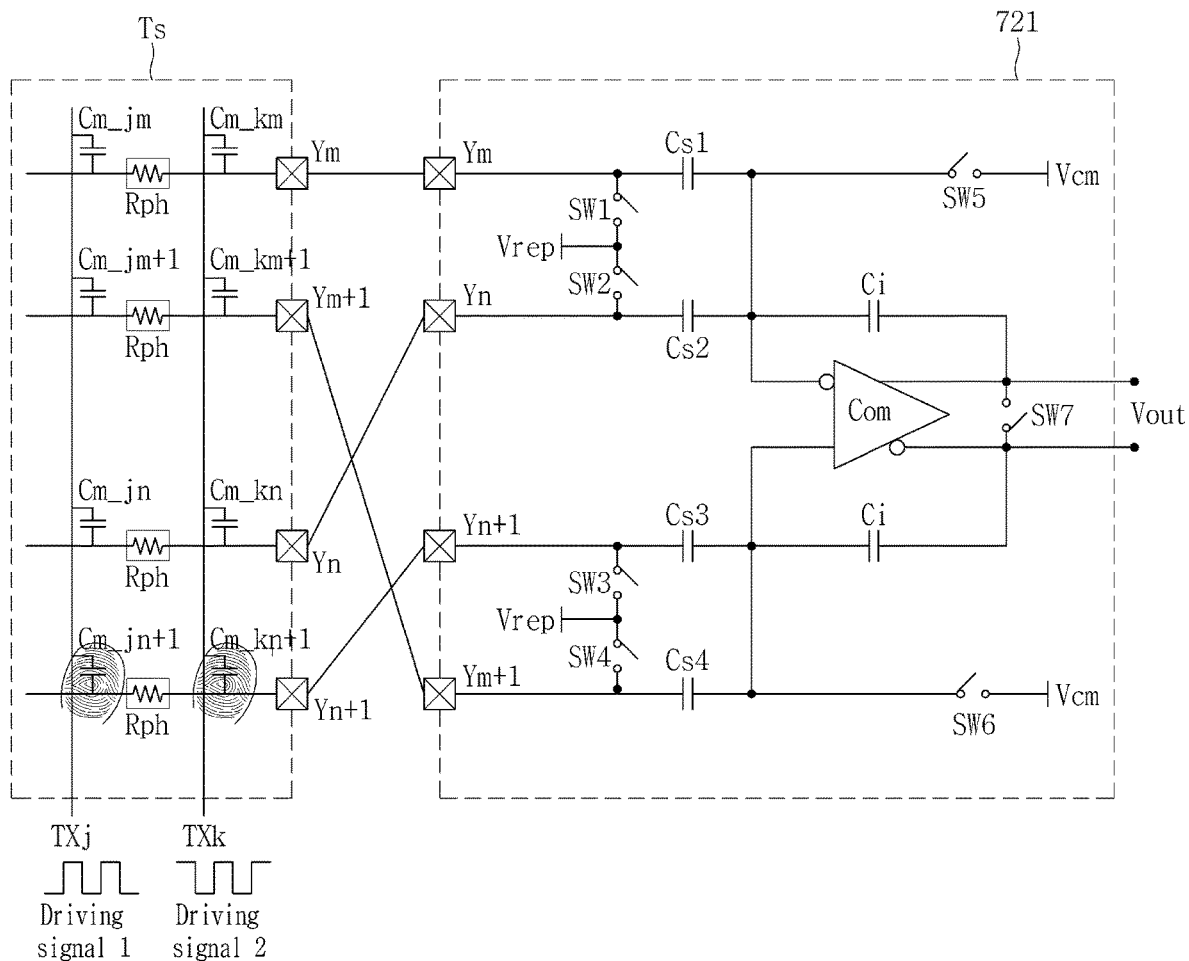
FIG. 23 is a circuit diagram illustrating a touch signal detector of a touch sensor chip according to an alternative exemplary embodiment.

FIG. 23 is a circuit diagram illustrating a touch signal detector of a touch sensor chip according to an alternative exemplary embodiment.

Figure 24:
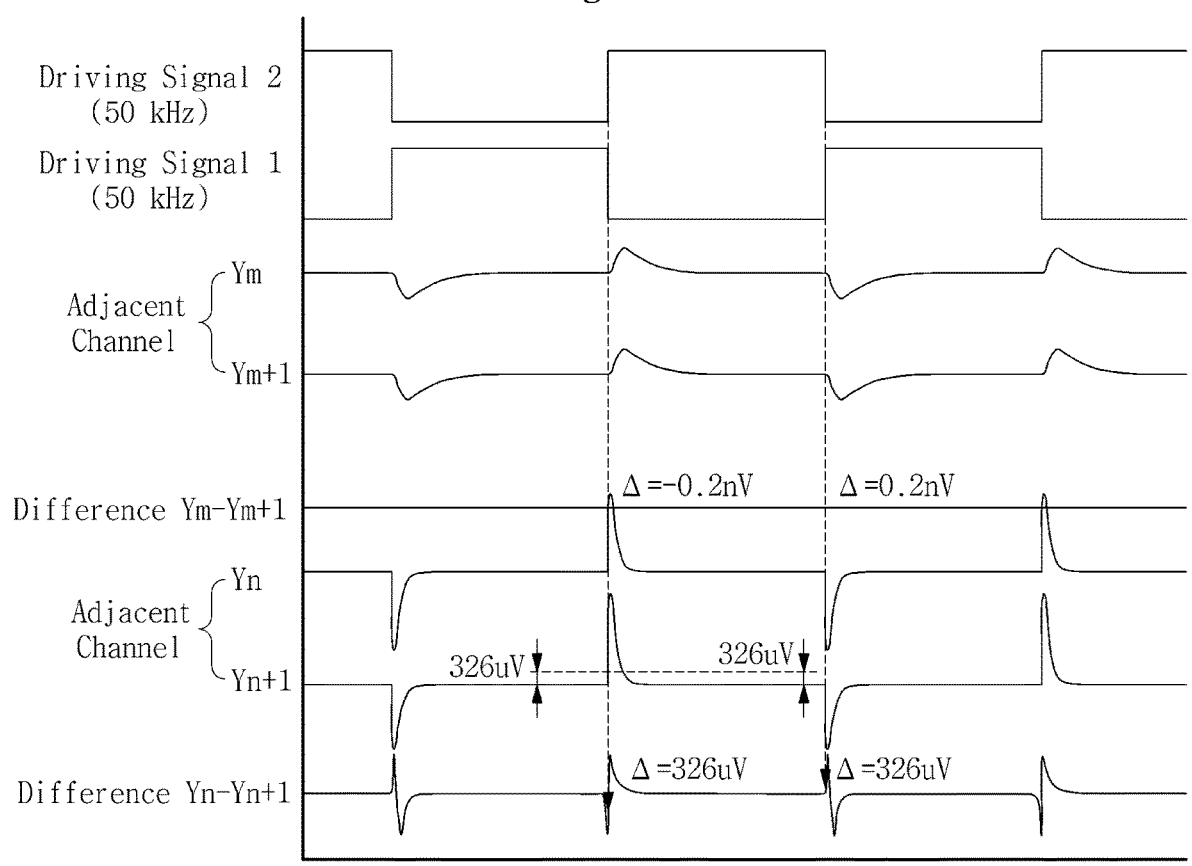
FIG. 24 is an exemplary waveform diagram illustrating a sensing electrode for detecting a touch in the circuit diagram of FIG. 23.

FIG. 24 is an exemplary waveform diagram illustrating a sensing electrode for detecting a touch in the circuit diagram of FIG. 23.

FIGS. 23 and 24 illustrate a state in which a user substantially simultaneously touches the point where the transmitting electrode TXj crosses the sensing electrode Yn+1 and the point where the transmitting electrode TXk crosses the sensing electrode Yn+1.

The first touch detection signal (the driving signal 1) is applied to the transmitting electrode TXj and is output to the output end of the sensing electrode Yn+1 through the mutual capacitor Cm_jn+1. A part of a signal power of the first touch detection signal (the driving signal 1) is distributed to a touch capacitor (not illustrated) and is output to the output end of the sensing electrode Yn+1.

The second touch detection signal (the driving signal 2) is applied to the transmitting electrode TXk and is output to the output end of the sensing electrode Yn+1 through the mutual capacitor Cm_kn+1. A part of a signal power of the second touch detection signal (the driving signal 2) is distributed to a touch capacitor (not illustrated) and is output to the output end of the sensing electrode Yn+1.

Since the first touch detection signal (the driving signal 1) and the second touch detection signal (the driving signal 2) which are both attenuated by the touch are transmitted to the output end of the sensing electrode Yn+1, a voltage of all smooth portions affected by the first touch detection signal (the driving signal 1) and the second touch detection signal (the driving signal 2) in the output waveform of the sensing electrode Yn+1 is reduced by about 326 μV as compared to the voltage in the standby state where no touch occurs.

As described hereinabove with reference to FIGS. 15 to 24, the touch sensing system according to an exemplary embodiment may substantially simultaneously detect a plurality of sensing electrodes Y and substantially simultaneously determine whether or not the plurality of transmitting electrodes TX are touched by using the touch detection signals having different phases. Accordingly, a touch sensing system for substantially simultaneously detecting the multi-touch state of the touch sensor Ts may be implemented.

Figure 25:
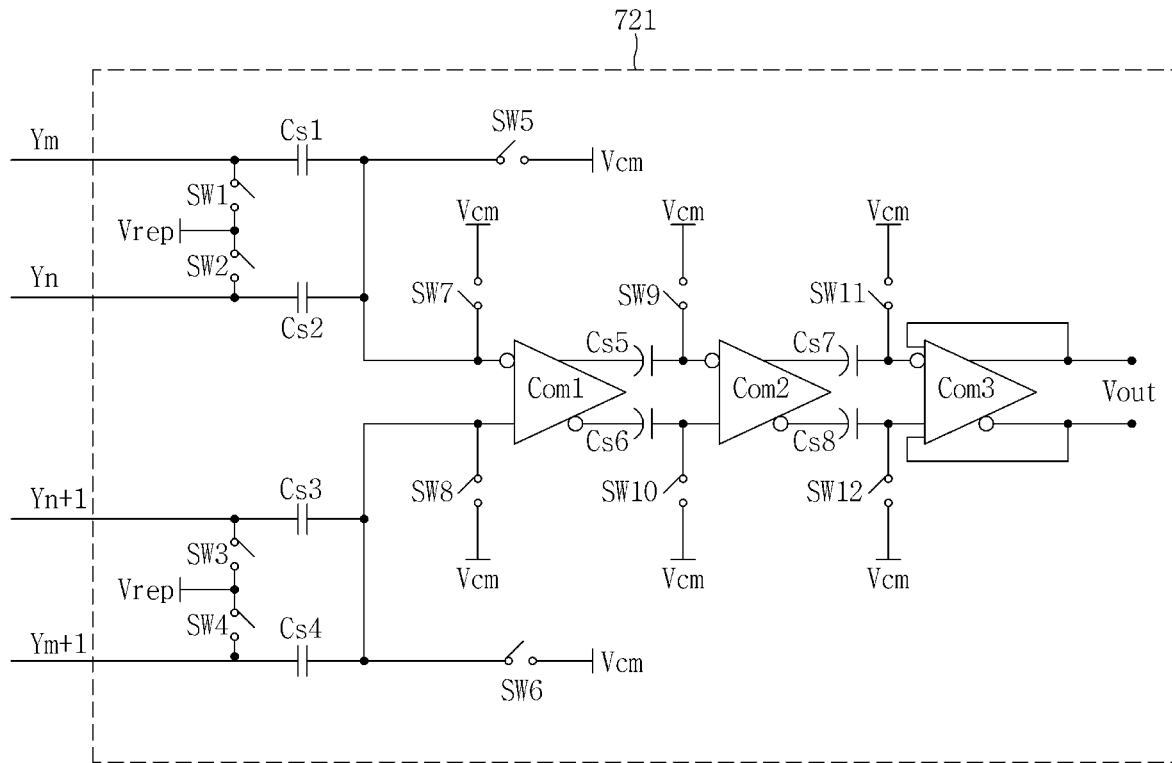
FIG. 25 is a circuit diagram illustrating a touch signal detector of a touch sensor chip according to another alternative exemplary embodiment.

FIG. 25 is a circuit diagram illustrating a touch signal detector of a touch sensor chip according to another alternative exemplary embodiment.

Referring to FIG. 25, a differential amplifier 721 of a touch sensor chip 720 includes four input ends. The four input ends of the differential amplifier 721 are connected to four sensing electrodes Ym, Ym+1, Yn and Yn+1 of a touch sensor Ts, respectively.

The differential amplifier 721 further includes a plurality of comparators, e.g., first, second, and third comparators Com1, Com2 and Com3 which are connected in series. Each of the comparators Com1, Com2 and Com3 includes two input ends and two output ends. One of the input ends of the first comparator Com1 is connected to two sensing electrodes Ym and Yn through serial capacitors Cs1 and Cs2, respectively. The other of the input ends of the first comparator Com1 is connected to the other two sensing electrodes Ym+1 and Yn+1 through serial capacitors Cs4 and Cs3, respectively.

The two output ends of the first comparator Com1 include two output terminals and the output terminals are connected to the input ends of the second comparator Com2 through serial capacitors Cs5 and Cs6, respectively.

The two output ends of the second comparator Com2 include two output terminals and the output terminals are connected to the input ends of the third comparator Com3 through serial capacitors Cs7 and Cs8, respectively.

The two output ends of the third comparator Com3 include two output terminals and output an output value Vout which is a voltage difference between the two output terminals. In addition, the output terminals are connected to the input terminals of the third comparator Com3 by feedback wirings, respectively.

The serial capacitors Cs5, Cs6, Cs7 and Cs8 connected to the input end of the comparator may be connected to an end applied with a common voltage Vcm through switches SW7, SW8, SW9, SW10, SW11 and SW12.

Through the circuit configuration of the plurality of comparators connected in series illustrated in FIG. 25, a small difference in a signal applied from the touch sensor Ts may be amplified to detect the touch position.

Figure 26:
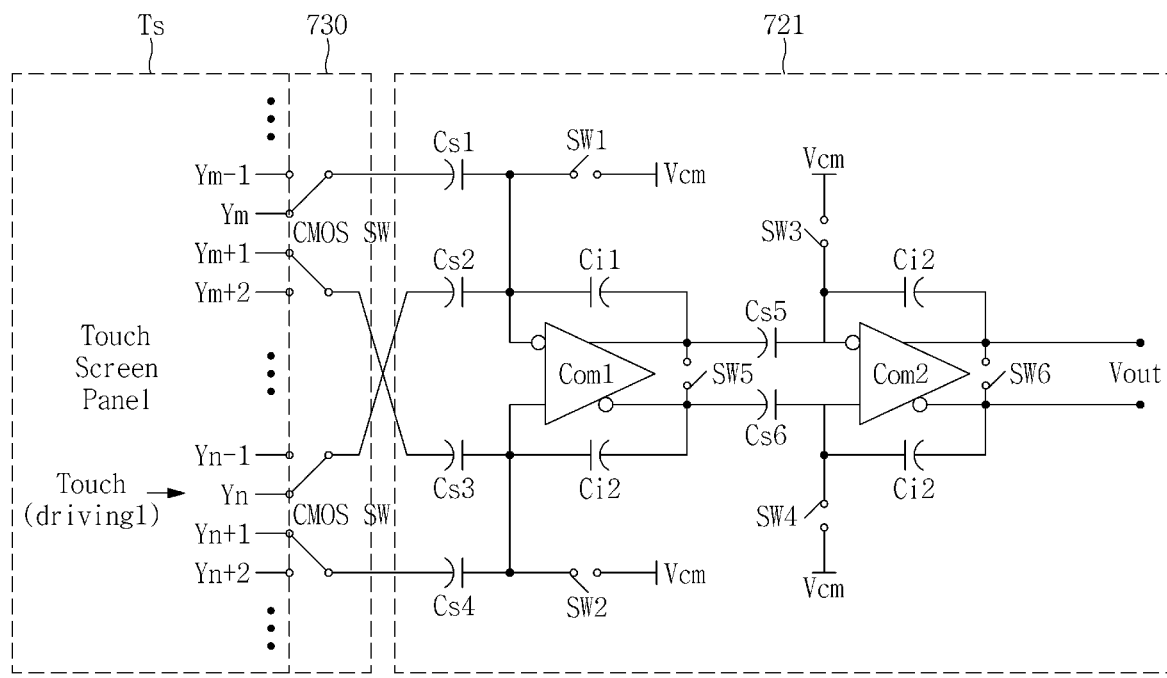
FIG. 26 is a circuit diagram illustrating a touch signal detector of a touch sensor chip according to another alternative exemplary embodiment.

FIG. 26 is a circuit diagram illustrating a touch signal detector of a touch sensor chip according to another alternative exemplary embodiment.

Referring to FIG. 26, an output end of a sensing electrode Y (Ym−1, Ym, . . . , Yn, Yn+1 and Yn+2) of a touch sensor Ts is connected to an input end of a differential amplifier 721 through a multiplexer 730.

Input ends of the multiplexer 730 are connected to respective output ends of four or more sensing electrodes Y and the respective output ends of the four or more sensing electrodes Y are connected to four input ends of the differential amplifier 721. The multiplexer 730 selectively selects, according to a timing signal, four of the output ends of the plurality of sensing electrodes Y of the touch sensor Ts for the four selected output ends to be connected to the four input ends of the differential amplifier 721.

For example, of the output ends of the sensing electrodes Y, output ends of sensing electrodes Ym and Ym+1 which are adjacent to each other are selected as one pair, and output ends of sensing electrodes Yn and Yn+1 which are adjacent to each other and spaced apart from the selected one pair of sensing electrodes Ym and Ym+1 are selected as another pair.

The selected one pair of adjacent sensing electrodes Ym and Ym+1 are connected to input terminals of a first comparator Com1 of the differential amplifier 721, respectively. The selected another pair of adjacent sensing electrodes Yn and Yn+1 are also connected to the input terminals of the first comparator Com1 of the differential amplifier 721, respectively.

Output ends (i.e., output terminals) of the first comparator Com1 may be connected to input ends of a second comparator Com2 located at a succeeding stage of the first comparator Com1 through serial capacitors Cs5 and Cs6, respectively.

The multiplexer 730 is configured such that a touch state of more than four sensing electrodes Y may be detected by using the differential amplifier 721 including four input ends, thus implementing an efficient touch sensing system.

Figure 27:
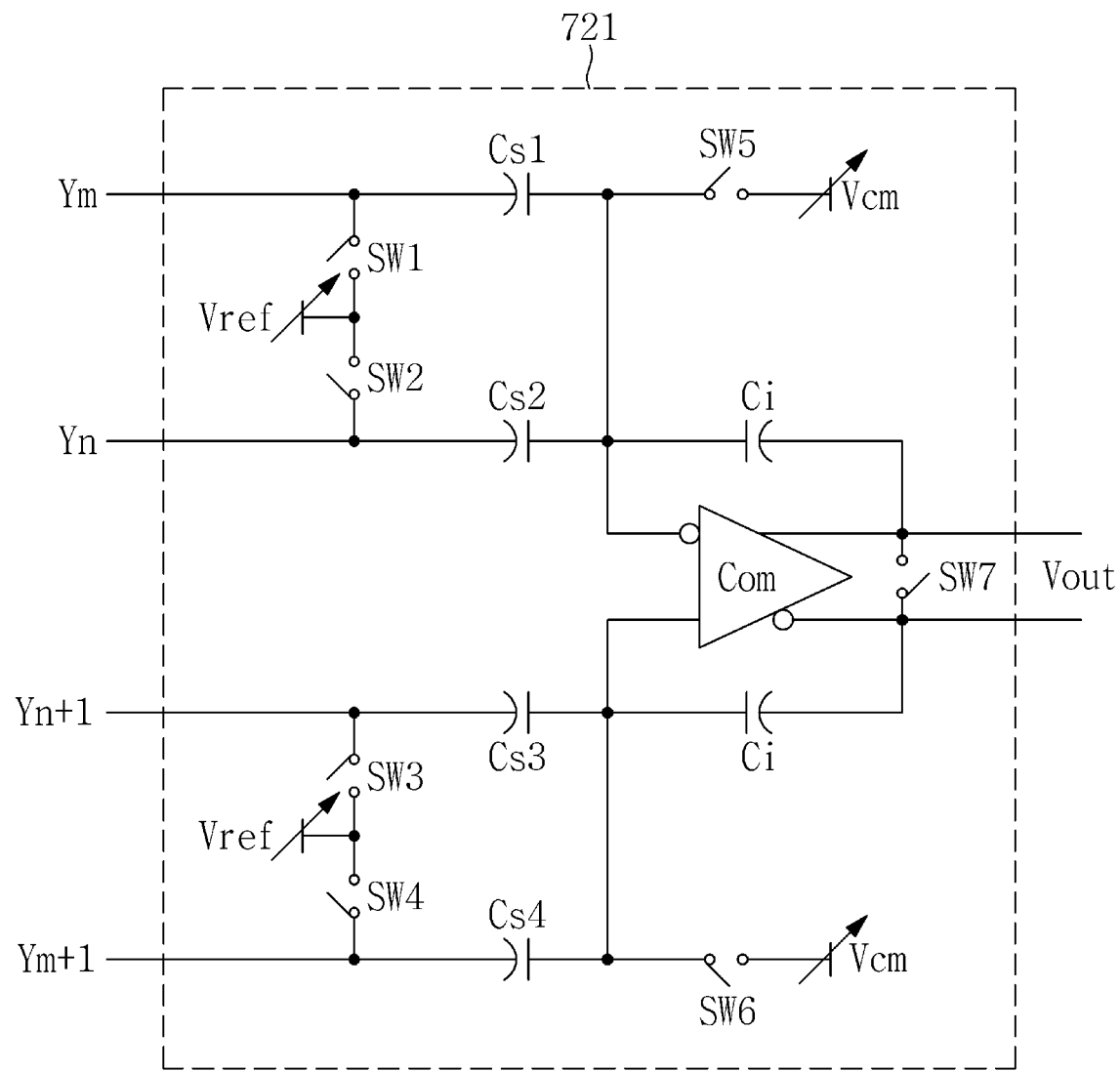
FIG. 27 is a circuit diagram illustrating a touch signal detector of a touch sensor chip according to still another alternative exemplary embodiment.

FIG. 27 is a circuit diagram illustrating a touch signal detector of a touch sensor chip according to still another alternative exemplary embodiment.

Referring to FIG. 27, in a differential amplifier 721 of a touch sensor chip 720, a reference voltage Vref and a common voltage Vcm for initializing serial capacitors Cs may vary.

As a size of a touch sensor Ts increases in a touch sensing system, it is necessary to use a touch detection signal having a high voltage. In such an exemplary embodiment, the reference voltage Vref and the common voltage Vcm may vary in conjunction with a change of the voltage of the touch detection signal. Accordingly, a touch sensing system that may be applied to devices having various sizes may be implemented without changing an internal design of the touch sensor chip 720 and the differential amplifier 721.

As set forth hereinabove, according to one or more exemplary embodiments, a signal-to-noise ratio in a reception channel of a touch sensing system may be improved by detecting input signals between adjacent lines using a differential amplifier.

While the present inventive concept has been illustrated and described with reference to the exemplary embodiments thereof, it will be apparent to those of ordinary skill in the art that various changes in form and detail may be formed thereto without departing from the spirit and scope of the present inventive concept.

What is claimed is:

1. A touch sensing system comprising:
   a touch sensor comprising a plurality of sensing electrodes; and
   a first comparator comprising a first input end, a second input end and an output end, the first comparator amplifying a difference between the first input end and the second input end,
   wherein the first input end is electrically connected to at least two sensing electrodes of the plurality of sensing electrodes which are not adjacent to each other at the same time at a first time, and
   the second input end is electrically connected to at least two sensing electrodes of the plurality of sensing electrodes which are not adjacent each other at the same time at the first time, respectively,
   wherein the at least two sensing electrodes electrically connected to the first input end are adjacent to the at least two sensing electrodes electrically connected to the second input end, respectively,
   wherein the at least two sensing electrodes electrically connected to the first input end are not electrically connected to the second input end, and
   wherein the at least two sensing electrodes electrically connected to the second input end are not electrically connected to the first input end.

2. The touch sensing system of claim 1, wherein the first input end and the second input end are connected to the at least two sensing electrodes through serial capacitors, respectively.

3. The touch sensing system of claim 2, wherein the output end of the first comparator comprises a plurality of output terminals and one of the plurality of output terminals is connected to the first input end through a serial capacitor.

4. The touch sensing system of claim 3, wherein another of the plurality of output terminals of the first comparator is connected to the second input end through a serial capacitor.

5. The touch sensing system of claim 4, further comprising a switch for connecting one end of at least one of the serial capacitors connected to the first input end to a reference voltage source.

6. The touch sensing system of claim 5, further comprising a switch for connecting at least one of the serial capacitors connected to the second input end to a reference voltage source.

7. The touch sensing system of claim 6, wherein the reference voltage source is a variable voltage source.

8. The touch sensing system of claim 1, further comprising a multiplexer for selectively connecting the first input end and the second input end to the plurality of sensing electrodes.

9. The touch sensing system of claim 1, further comprising a second comparator comprising input terminals connected to output terminals of the first comparator.

10. The touch sensing system of claim 9, further comprising capacitors between the output terminals of the first comparator and the input terminals of the second comparator, respectively.

11. A touch sensing system comprising:
    a touch sensor comprising a plurality of transmitting electrodes and a plurality of sensing electrodes insulated from and crossing the plurality of transmitting electrodes;
    a touch driver transmitting a touch detection signal to the plurality of transmitting electrodes; and
    a first comparator comprising a first input end, a second input end and an output end, the first comparator amplifying a difference between the first input end and the second input end,
    wherein the touch driver substantially simultaneously transmits touch detection signals having different phases to the plurality of transmitting electrodes,
    the first input end is electrically connected to at least two sensing electrodes of the plurality of sensing electrodes which are not adjacent to each other at the same time at a first time, and
    the second input end is electrically connected to at least two sensing electrodes of the plurality of sensing electrodes which are not adjacent to each other at the same time at the first time, respectively,
    wherein the at least two sensing electrodes electrically connected to the first input end are adjacent to the at least two sensing electrodes electrically connected to the second input end, respectively,
    wherein the at least two sensing electrodes electrically connected to the first input end are not electrically connected to the second input end, and
    wherein the at least two sensing electrodes electrically connected to the second input end are not electrically connected to the first input end.

12. The touch sensing system of claim 11, wherein the first input end and the second input end are connected to the at least two sensing electrodes through serial capacitors, respectively.

13. The touch sensing system of claim 12, wherein the output end of the first comparator comprises a plurality of output terminals and one of the plurality of output terminals is connected to the first input end by a serial capacitor.

14. The touch sensing system of claim 13, further comprising a switch for connecting one end of at least one of the serial capacitors connected to the first input end to a reference voltage source.

15. The touch sensing system of claim 11, further comprising a multiplexer for selectively connecting the first input end and the second input end to the plurality of sensing electrodes.

16. The touch sensing system of claim 11, further comprising a second comparator comprising input terminals connected to output terminals of the first comparator.

* * * * *